United States Patent [19]
Taniguchi et al.

[11] Patent Number: 6,120,410
[45] Date of Patent: Sep. 19, 2000

[54] AUTOMATIC TRANSMISSION FOR VEHICLE

[75] Inventors: Takao Taniguchi; Kazumasa Tsukamoto; Masahiro Hayabuchi; Satoru Kasuya; Hiroshi Katou; Masaaki Nishida; Akitoshi Katou, all of Anjo, Japan

[73] Assignee: Aisin AW Co., Ltd., Anjo, Japan

[21] Appl. No.: 09/325,566

[22] Filed: Jun. 4, 1999

[30] Foreign Application Priority Data

| Sep. 1, 1998 | [JP] | Japan | 10-262313 |
| Nov. 27, 1998 | [JP] | Japan | 10-353907 |
| Apr. 28, 1999 | [JP] | Japan | 11-123221 |

[51] Int. Cl.⁷ .................................................. F16H 3/62
[52] U.S. Cl. ................................................. 475/285
[58] Field of Search ........................... 475/275, 284, 475/285

[56] References Cited

U.S. PATENT DOCUMENTS

| 4,347,765 | 9/1982 | Leonard et al. . |
| 5,106,352 | 4/1992 | Lepelletier . |
| 5,122,103 | 6/1992 | Nakawaki et al. ...................... 475/278 |
| 5,495,778 | 3/1996 | Mochizuki . |
| 5,823,910 | 10/1998 | Park ........................................ 475/271 |

*Primary Examiner*—Dirk Wright
*Attorney, Agent, or Firm*—Oliff & Berridge, PLC

[57] ABSTRACT

An automatic transmission establishing multiple gear stages includes a reduction planetary gear, at least two clutches transmitting a decelerated rotation transmitted from the reduction planetary gear, and a planetary gear set inputted the decelerated rotation transmitted through the two clutches. The reduction planetary gear and the two clutches are arranged in one side of the planetary gear set. The reduction planetary gear is arranged between the clutches.

24 Claims, 19 Drawing Sheets

|  | C-1 | C-2 | C-3 | B-1 | B-2 | F-1 | Gear ratio | Step |
|---|---|---|---|---|---|---|---|---|
| P |  |  |  |  |  |  |  |  |
| REV |  |  | ○ |  | ○ |  | 3.389 |  |
| N |  |  |  |  |  |  |  |  |
| 1ST | ○ |  |  |  | (○) | ○ | 4.067 | ) 1.73 |
| 2ND | ○ |  |  | ○ |  |  | 2.354 | ) 1.51 |
| 3RD | ○ |  | ○ |  |  |  | 1.564 | ) 1.35 |
| 4TH | ○ | ○ |  |  |  |  | 1.161 | ) 1.35 |
| 5TH |  | ○ | ○ |  |  |  | 0.857 | ) 1.25 |
| 6TH |  | ○ |  | ○ |  |  | 0.684 |  |

FIG.17

| | C-1 | C-2 | C-3 | B-1 | B-2 | B-3 | F-1 | F-2 | Gear Train | Step |
|---|---|---|---|---|---|---|---|---|---|---|
| P | | | | | | | | | | |
| REV | | | ○ | | | ○ | | | 3.394 | |
| N | | | | | | | | | | |
| 1ST | ○ | | | | | | | ○ | 4.148 | |
| | | | | | | | | | | 1.75 |
| 2ND | ○ | | | △ | | | ○ | | 2.370 | |
| | | | | | | | | | | 1.52 |
| 3RD | ○ | | ○ | | ● | | | | 1.556 | |
| | | | | | | | | | | 1.35 |
| 4TH | ○ | ○ | | | ● | | | | 1.155 | |
| | | | | | | | | | | 1.34 |
| 5TH | | ○ | ○ | | ● | | | | 0.859 | |
| | | | | | | | | | | 1.25 |
| 6TH | | ○ | | ○ | ● | | | | 0.686 | | ant
AUTOMATIC TRANSMISSION FOR VEHICLE

BACKGROUND OF THE INVENTION

1. Field of the Invention

The invention relates to an automatic transmission for a vehicle. More specifically, it relates to the arrangement of the each transmission structural element in the gear train.

2. Description of the Related Art

An automatic transmission for a vehicle is required to multiply the gear ratios to improve driving performance and fuel consumption. To achieve the requirement, transmission mechanisms tend to go from a mechanism having four forward speeds to a mechanism having five forward speeds. For achieving further multiplication of the gear stages in the limited mounting space in a vehicle, a reduction in the number of elements of the gear train and a simplification of the mechanism are needed. A gear train, which establishes six forward speeds and one reverse speed, with a planetary gear set having minimum shift elements, is suggested in U.S. Pat. No. 5,106,352. In the gear train, forward six speeds are established by using an input rotation and outputting two decelerated rotations from the input rotation that are inputted to a planetary gear set having four shift elements.

In the aforementioned gear train, the number of shift elements and the number of clutches and brakes needed to establish the gear stages are reasonable. However, the gear train has problems which have to be improved. In the gear train, two clutches, which input the decelerated rotation transmitted through the reduction planetary gear to two different elements of the planetary gear set, are needed. These clutches need larger torque capacities than a clutch receiving the usual non-decelerated rotation because the clutches transmit the torque amplified by the deceleration. In the aforementioned structure, two clutches, which transmit the decelerated rotations, are arranged in one side of the reduction planetary gear in which the sun gear is always fixed and acts as a reaction element. Further, one clutch of the two clutches is arranged apart from the reduction planetary gear. Therefore, a long member for transmitting a high torque is needed. As a result, the size and the weight of the transmission are increased.

SUMMARY OF THE INVENTION

In view of the above problems associated with the related art, an object of the invention is to provide an automatic transmission having a shift mechanism, which establishes multiple gear stages by inputting two decelerated rotations to a planetary gear set, obtaining enough torque capacity of the two decelerated rotation input clutches, and preventing an increase in the size and the weight of the transmission by shortening the high torque transmission route.

To achieve the aforementioned object, in the invention, an automatic transmission for a vehicle comprises a reduction planetary gear, two clutches transmitting a decelerated rotation which is transmitted through the reduction planetary gear, and a planetary gear set inputted the decelerated rotation which is transmitted through the two clutches. The automatic transmission establishes multiple gear ratios. In the automatic transmission, the reduction planetary gear and the first and third clutches, which input the decelerated rotation transmitted through the reduction planetary gear to two different elements of the planetary gear set, are arranged in one side of the planetary gear set, and the reduction planetary gear is arranged between the first clutch and the third clutch.

It is effective that a first element of the planetary gear set is connected to the output side member of the first clutch, a second element is connected to an output side member of the third clutch and it can be engaged to a transmission case with a first engaging member, a third element is connected to an output side member of a second clutch, which is inputted a non-decelerated rotation, and it can be engaged to the transmission case with a second engaging member, and a fourth element is connected to an output member.

It is effective that one element of the reduction planetary gear is fixed to a boss portion extended from the transmission case, a hydraulic servo of the third clutch is rotatably supported on the boss portion, a hydraulic servo of the first clutch is arranged on an input shaft, and the third clutch and a one element of the planetary gear set are connected with a power transmission member which extends in the radial outer space of the first clutch.

Further, it is effective that an output element of the reduction planetary gear is directly connected to a clutch hub which is engaged with the inner portion of the frictional member of the third clutch, the hydraulic servo of the third clutch is arranged such that the cylinder opens to the reduction planetary gear side and is connected to a clutch drum which is engaged with the outer portion of the frictional member of the third clutch. The clutch drum is connected through the power transmission member to an element of the planetary gear set.

Further, it is effective that a clutch hub, which is engaged with the inner portion of the frictional member of the first clutch, is connected to the output element of the reduction planetary gear, a clutch drum, which is engaged with the outer portion of the frictional member of the first clutch, is connected to an element of the planetary gear set, and the hydraulic servo, which is connected to the clutch drum of the first clutch, is arranged in order that the cylinder opens to the reduction planetary gear side.

In the aforementioned case, it is effective that the output element of the reduction planetary gear is connected to the clutch hub which is engaged with the inner portion of the frictional member of the third clutch, the frictional member of the third clutch is arranged in the radial outer side of the reduction planetary gear, and the clutch hub is further axially extended and connected to the clutch hub which is engaged with the inner portion of the frictional member of the first clutch.

Further, it is effective that the hydraulic servo of the first clutch is arranged in order that the cylinder opens to the opposite side of the reduction planetary gear and is connected to the clutch drum of the first clutch at the radial outer portion. The clutch drum of the first clutch is connected to the output element of the reduction planetary gear.

Further, it is possible to structure the transmission such that the output element of the reduction planetary gear is connected to the clutch hub which is engaged with the inner portion of the frictional member of the third clutch arranged in the radial outer side of the reduction planetary gear, and the output element is connected to the clutch drum of the first clutch at the axially extending position.

Further, it is effective that the hydraulic servo connected to the clutch drum of the third clutch is supported on the boss portion at the radial position of the reduction planetary gear.

Further, it is effective that the first engaging member is a band brake in which the outer surface of the clutch drum of the third clutch is an engaging surface engaged by the band.

Further, it is effective that a hydraulic path for applying a hydraulic pressure to the hydraulic servo of the third clutch is formed in the boss portion, and a hydraulic path for applying a hydraulic pressure to the hydraulic servo of the first clutch is a hydraulic path connected through a shaft hydraulic path formed in the input shaft to a hydraulic path formed in the transmission case.

Further, it is effective that the reduction planetary gear, the first clutch and the third clutch are arranged in the rear portion of the transmission, the shaft hydraulic path is connected to the hydraulic path formed in the transmission case at the rear end portion of the input shaft, and a seal ring is arranged between the input shaft and the transmission case for sealing.

According to the above, the first and third clutches, which need high torque capacities for transmitting the torque amplified at the reduction planetary gear, are arranged in close proximity to the reduction planetary gear. Therefore, the structure of the high torque transmission route is shortened. As a result, the weight and the size of the transmission are reduced. The aforementioned result is achieved in a transmission having six speeds with a small number of elements.

The one element of the reduction planetary gear is always fixed on the boss portion extended from the transmission case so that a particular support member for fixing is not needed. Therefore, the transmission is compact. Further, in this structure, the power transmission member connecting the third clutch and the planetary gear set is extended in the radial outer space of the first clutch. However, the hydraulic servo of the first clutch is arranged on the input shaft which has a smaller diameter than the boss portion so that the pressure receiving area of the hydraulic servo is radially enlarged in the inner direction compared with the prior art in which the hydraulic servo is arranged on the boss portion. Therefore, with respect to the first clutch, for which it was difficult to obtain sufficient clutch capacity because of the limitation at the outer side, sufficient clutch capacity is obtained by enlarging the pressure receiving area of the hydraulic servo.

The output from the reduction planetary gear is directly transmitted to the hub, which is the input side member of the frictional member of the third clutch, without going through another member. Therefore, the output side transmission route, which transmits the high torque, of the reduction planetary gear is shortened. Further, the high torque transmitted to the hub of the third clutch is transmitted from the clutch drum arranged in the outer side to the planetary gear set without providing the torque load to the hydraulic servo arranged in the inner side. Therefore, the hydraulic servo connected to the clutch drum can be thin. As a result, the weight and the size of the transmission are reduced.

The power transmission member connecting the first clutch and one shift element of the planetary gear set is common with the cylinder of the hydraulic servo of the first clutch. Therefore, the number of rotational members is reduced so that the transmission becomes compact.

The frictional member of the third clutch is arranged at the radial outer side of the reduction planetary gear. Therefore, the transmission route between the output element of the reduction planetary gear and the input side member of the third clutch is shortened. Further, the member, which structures the output side transmission route connecting the third clutch, which is apart from the planetary gear set, and the planetary gear set is shortened. Further, the inner side hub of the first clutch and the inner side hub of the third clutch are in common with each other. Therefore, some members are in common and the high torque transmission member is shortened so that the weight and the size of the transmission are reduced.

The high torque is transmitted from the hub of the first clutch to the clutch drum arranged in the outer side without providing the torque load to the hydraulic servo connected to the inner portion of the drum. Therefore, the hydraulic servo arranged in the inner side can be thin. As a result, the weight and the size of the transmission is reduced.

The frictional member of the third clutch is arranged at the radial outer side of the reduction planetary gear. Therefore, the transmission route between the output element of the reduction planetary gear and the input side member of the third clutch is shortened. Further, the member, which structures the output side transmission route connecting the third clutch apart from the planetary gear set and the planetary gear set, is shortened. Further, the outer side drum of the first clutch and the inner side hub of the third clutch are in common with each other. Therefore, some members are in common and the high torque transmission member is shortened so that the weight and the size of the transmission are reduced.

The drum of the third clutch is supported in the radial position of the reduction planetary gear. Therefore, the axial space for supporting the drum is reduced. As a result, the axial size of the transmission is reduced.

The first engaging member is the band brake. The band brake needs arrangement space which is relatively small in the radial direction. Therefore, the necessary radial outer space for the third clutch is obtained and the diameter of the clutch can be increased even by radially superposing the first engaging member and the third clutch which are connected to the second element of the planetary gear set. The torque transmission capacity is obtained by increasing the diameter of the clutch. As a result, the axial size of the clutch is reduced. Further, the clutch drum of the third clutch is rotatably supported on the boss portion so that the drum, of which the outer surface is engaged by the band brake, is certainly supported.

The arrangement spaces for the reduction planetary gear, the first clutch and the third clutch are compact. Further, the number of seal rings, which reduces the transmission efficiency by the sliding load, is reduced.

The hydraulic path applying hydraulic pressure to the first clutch is connected through the axial end of the input shaft to the transmission case. Therefore, an increase in the number of seal rings for sealing the hydraulic path is minimized. As a result, a decrease in the transmission efficiency resulting from an increase in the sliding load is prevented.

BRIEF DESCRIPTION OF THE DRAWINGS

The invention will be described in conjunction with the following drawings in which like features are designated with like reference characters, and wherein:

FIG. 17 is a table showing the operation of the gear train, the established gear ratios and the gear ratio steps in the tenth embodiment;

DETAILED DESCRIPTION OF PREFERRED EMBODIMENTS

Figure 1:
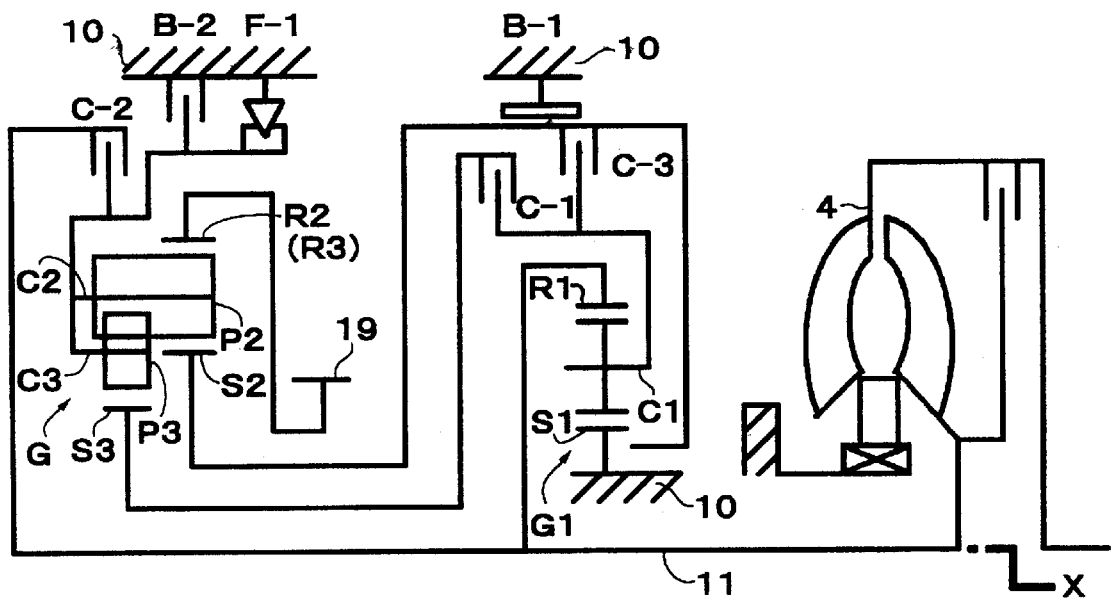
FIG. 1 is a schematic diagram illustrating a gear train of the first embodiment of an automatic transmission of the invention.
Figure 1:
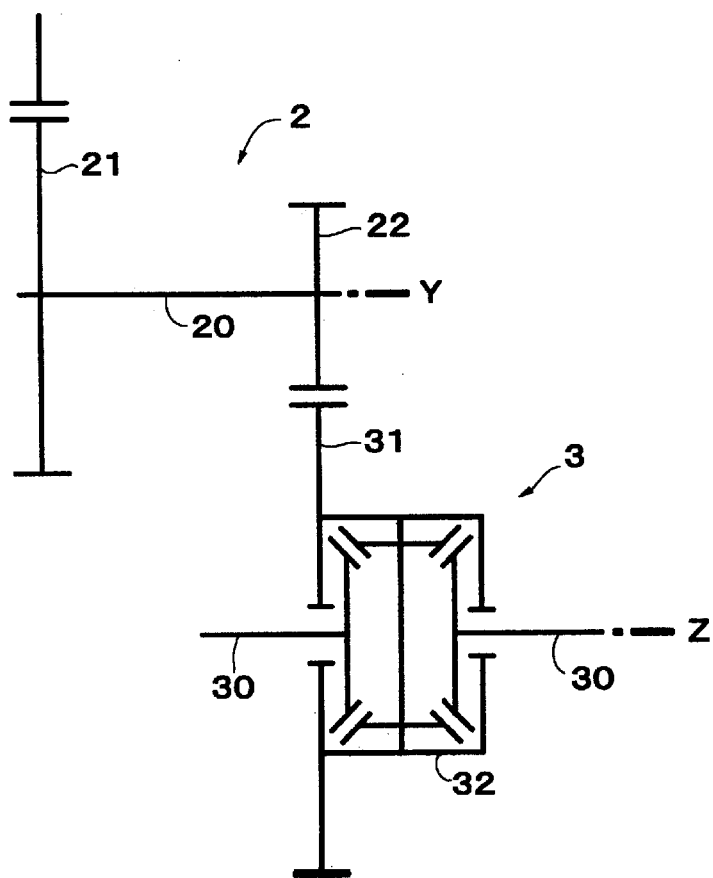
Figures 2, 3:
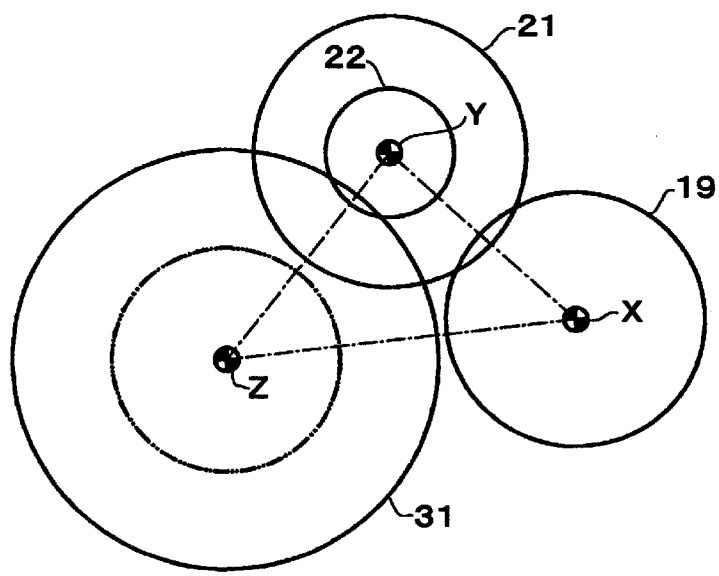
FIG. 2 is an axial end face diagram illustrating a positional relationship of the three axes in the gear train.
FIG. 3 is a table showing the operation of the gear train, the established gear ratios and the gear ratio steps.

The embodiment of the invention will be described with reference to figures. FIG. 1 illustrates a gear train of the first embodiment. In the figure, the axes are deployed in a common plane. FIG. 2 illustrates an actual positional relationship between the axes where the automatic transmission is viewed from the end surface. The automatic transmission establishes multiple gear stages using a reduction planetary gear G1, two clutches C-1, C-3 transmitting a decelerated rotation decelerated at the reduction planetary gear G1, and a planetary gear set G inputted the decelerated rotation through the two clutches. The reduction planetary gear G1 and the first and third clutches C-1, C-3 are arranged at one side of the planetary gear set G. The reduction planetary gear G1 is arranged between the first clutch C-1 and the third clutch C-3. The first and third clutches C-1, C-3 transmit the decelerated rotation to two different elements S2, S3 of the planetary gear set.

A further specific gear train structure of the automatic transmission will be described. The transmission is a transverse type transaxle for a front engine/front wheel drive (FF) or rear engine/rear wheel drive (RR) vehicle. As illustrated in FIGS. 1 and 2, the transaxle is structured having three axes, a main axis X, a counter axis Y and a differential axis Z arranged in parallel with each other. Each element of a shift mechanism is arranged on one of the axes. The shift mechanism, which comprises the planetary gear set G having four shift elements S2, S3, C2 (C3), R2 (R3), the reduction planetary gear G1, two brakes B-1, B-2 and three clutches C-1, C-2, C-3, is arranged in the position along the input shaft 11 which is on the main axis X. In the gear train, one of the decelerated rotation input elements S3 of the planetary gear set G is connected through the first clutch C-1 and the reduction planetary gear G1 to the input shaft 11, the other input element S2 is connected through the third clutch C-3 and the reduction planetary gear G1 to the input shaft 11 and can be engaged with a transmission case 10 by the first brake B-1, a non-decelerated rotation input element C2 (C3) is connected through the second clutch C-2 to the input shaft 11 and can be engaged with the transmission case 10 by the second brake B-2. A remaining shift element R2 (R3), as an output element, is connected to a counter drive gear 19 as an output element on the main axis X.

In the gear train in the figure, in addition to the aforementioned structure, a one-way clutch F-1 is arranged as an engagement element in parallel with the brake B-2. The one-way clutch F-1, which automatically releases an engagement force according to the engagement of the brake B-1, is used for preventing the complicated hydraulic control necessary for a clutch to clutch operation between the brake B-2 and the brake B-1, which is operated in 1-2 shift discussed later, and for simplifying the disengagement control of the brake B-2. The one-way clutch F-1 is substantially an equal of the brake B-2 except for the aforementioned transitional functions.

A torque converter 4, having a lock-up clutch and transmitting a rotation of an engine, not shown, to the input shaft 11, is arranged on the main axis X. A counter gear 2 is arranged on the counter axis Y. The counter gear 2 comprises a counter driven gear 21 having a large diameter and engaging with the counter drive gear 19, which is the output element on the main axis X. The counter driven gear 21 is fixed on the counter shaft 20 as is a differential drive pinion gear 22, which is an output element on the counter axis Y and has a small diameter. As a result, the output from the main axis side is reduced, inverted and transmitted to a differential unit 3 so that the final reduction speed ratios are achieved, and the rotational direction of the input shaft 11 and the rotational direction of the output from the differential unit 3 are accommodated. The differential unit 3 is arranged on the differential axis Z. The differential unit 3 is connected to the counter shaft 20 by engaging a differential ring gear 31 fixed on a differential case 32 with the differential drive pinion gear 22, and a differential rotation of a differential gear arranged in the case 32 is outputted to left and right shafts 30 as a final wheel driving force.

The planetary gear set G is structured from a ravegneaux type gear set which comprises a sun gear S2 having large diameter, a sun gear S3 having small diameter, a carrier C2 (C3) supporting a long pinion P2 and a short pinion P3 which are engaged with each other, and a ring gear R2 (R3), and in which the long pinion P2 engages with the large sun gear S2 and the ring gear R2 and the short pinion P3 engages with the small sun gear S3. It should be noted that there are two ring gears R2,R3 theoretically, but substantially, there is one ring gear R2 (R3) positioned in the outer position of either of the sun gears S2, S3. Therefore, the ring gear is denoted with the notation R2 or R3 according to the position against the sun gears S2, S3. In this embodiment, the large sun gear S2 and the small sun gear S3 are the decelerated rotation input elements, the carrier C2 (C3) is the non-decelerated rotation input element, and the ring gear R2 is the output element. The small sun gear S3 of the planetary gear set G is connected to the output side member of the clutch C-1, and the large sun gear S2 is connected to the output side member of the clutch C-3 and can be engaged with the transmission case 10 by the brake B-1. The carrier C2 (C3) is connected through the clutch C-2 to the input shaft 11, can be engaged with the transmission case 10 by the brake B-2, and can be engaged with the transmission case 10 in the one-way direction by the one-way clutch F-1. The ring gear R2 is connected to the counter drive gear 19.

In the reduction planetary gear G1, a sun gear S1 is one element which is fixed to the transmission case 10, a ring gear R1 is the input element and is connected to the input shaft 11, and a carrier C1 is the output element and is connected to the output side members of the clutch C-1 and the clutch C-3. The reduction planetary gear G1 is connected to the planetary gear set G with the aforementioned connecting relationship.

Figure 4:
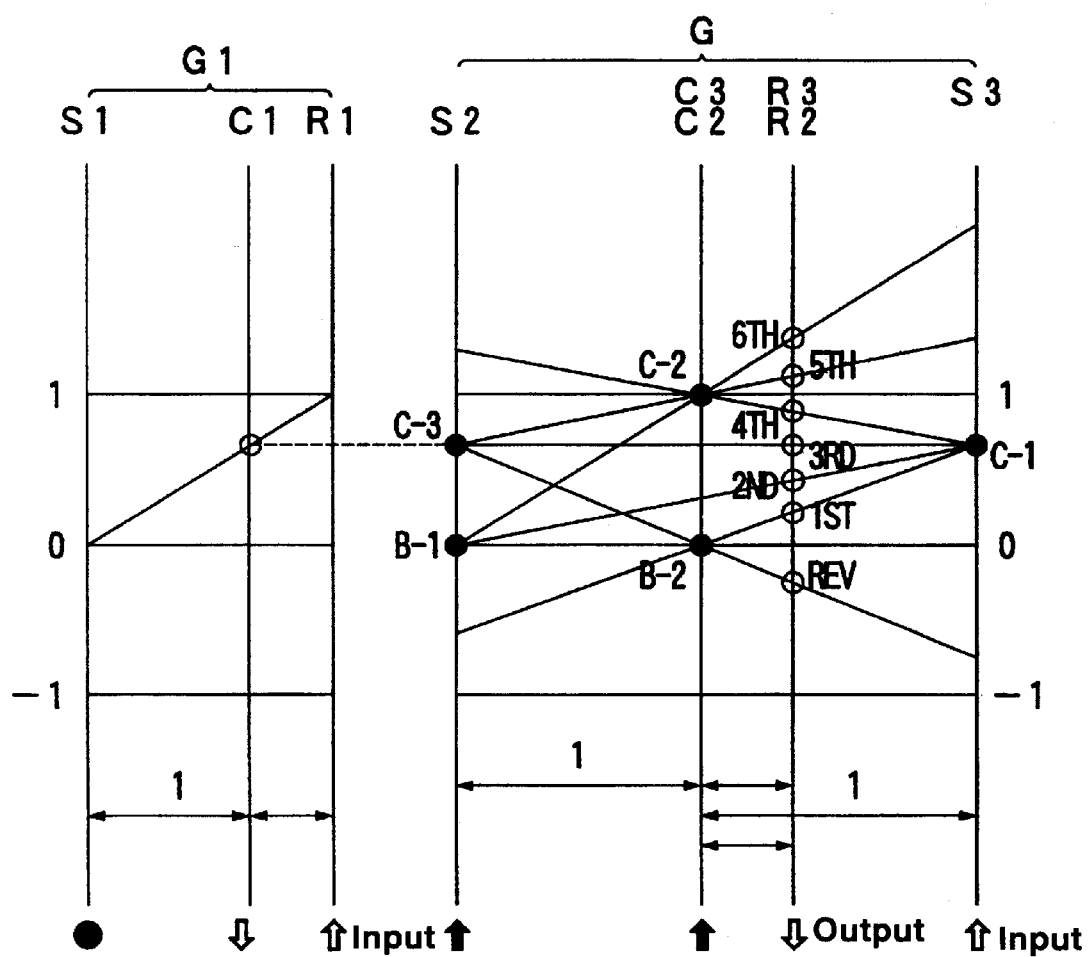
FIG. 4 is a velocity diagram for the gear train.

The automatic transmission thus structured shifts according to the vehicle load within gear stages corresponding to a shift range, selected by a driver, using an electronic control system and a hydraulic control system which are not shown in the figure. FIG. 3 shows the gear stages, which are established by the engagement and disengagement of each clutch and brake. In the table, the symbol ○ indicates engagement and a blank indicates disengagement. FIG. 4 shows the gear stages, which are established by engagement and disengagement of each clutch and brake, and the relationship with the rotational ratio of each shift element in each gear stage with a velocity diagram. In this diagram, the symbol ● indicates engagement.

As shown in both figures, a first speed (1ST) is established by engagement of the clutch C-1 and the brake B-2. It should be noted that, in this embodiment, as shown in the operational table, the automatic engagement of the one-way clutch F-1 is used instead of engagement of the brake B-2. The reason for using this engagement and the reason that this engagement is equivalent to engagement of the brake B-2 will be described later. In the first ratio, the decelerated rotation, which is decelerated from the rotation of the input shaft 11 through the reduction planetary gear G1, is inputted to the small sun gear S3 through the clutch C-1. The carrier C3, which is engaged with the transmission case 10 by the engagement of the one-way clutch F-1, acts as a reaction element, and the decelerated rotation of the ring gear R3, having the largest reduction ratio, is outputted to the counter drive gear 19.

Next, a second speed (2ND) is established by engagement of the clutch C-1 and the brake B-1. In this case, the decelerated rotation, which is decelerated from the rotation of the input shaft 11 through the reduction planetary gear G1, is inputted to the small sun gear S3 through the clutch C-1. The large sun gear S2, which is engaged with the transmission case 10 by engagement of the brake B-1, acts as a reaction element, and the decelerated rotation of the ring gear R2 (R3) is outputted to the counter drive gear 19. The reduction ratio in this case is less than the reduction ratio in the first speed (1ST).

Further, a third speed (3RD) is established by the concurrent engagements of the clutch C-1 and the clutch C-3. In this case, the decelerated rotation, which is decelerated from the rotation of the input shaft 11 through the reduction planetary gear G1, is concurrently inputted to the large sun gear S2 and the small sun gear S3 through the clutch C-1 and the clutch C-3 so that the planetary gear set G is in the directly connected state. The rotation of the ring gear R2 (R3), which is the same as the input rotation inputted to both sun gears S2, S3, is outputted to the counter drive gear 19 as the rotation decelerated from the rotation of the input shaft 11.

A fourth speed (4TH) is established by concurrently engaging the clutch C-1 and the clutch C-2. In this case, the decelerated rotation, which is decelerated from the rotation of the input shaft 11 through the reduction planetary gear G1, is inputted to the small sun gear S2 through the clutch C-1 on one side. The rotation which is not reduced and inputted from the input shaft 11 through the clutch C-2, is inputted to the carrier C2 (C3) on the other side, and the middle rotation between the two input rotations, which is the rotation of the ring gear R3 barely decelerated from the rotation of the input shaft 11, is outputted to the counter drive gear 19.

Next, a fifth speed (5TH) is established by the concurrent engagement of the clutch C-2 and the clutch C-3. In this case, the decelerated rotation, which is decelerated from the rotation of the input shaft 11 through the reduction planetary gear G1, is inputted to the small sun gear S2 through the clutch C-3 on one side. The non-decelerated rotation, which is not reduced and inputted from the input shaft 11 through the clutch C-2, is inputted to the carrier C2 (C3) on the other side, and the rotation of the ring gear R2, which is barely accelerated from the rotation of the input shaft 11, is outputted to the counter drive gear 19.

Then, a sixth speed (6TH) is established by engagement of the clutch C-2 and the brake B-1. In this case, the non-decelerated rotation from the input shaft 11, which is not reduced, is inputted to the carrier C2 (C3) through the clutch C-2. The sun gear S2, which is engaged with the transmission case by engagement of the brake B-1, acts as a reaction element, and the rotation of the ring gear R2, which is further accelerated, is outputted to the counter drive gear 19.

A reverse speed (REV) is established by the engagements of the clutch C-3 and the brake B-2. In this case, the decelerated rotation, which is decelerated from the rotation of the input shaft 11 through the reduction planetary gear G1, is inputted to the sun gear S2 through the clutch C-3. The carrier C2, which is engaged with the transmission case 10 by the engagement of the brake B-2, acts as a reaction element, and the rotation of the ring gear R2, which is a reverse rotation, is outputted to the counter drive gear 19.

The relationship between the one-way clutch F-1 and the brake B-2 mentioned above will now be described. As shown in the relationship of engagement/disengagement of both brakes B-1, B-2 in the first speed and the second speed, one of the brakes is disengaged and the other brake is engaged concurrently in the up/down shift between these gear stages. That is, the brakes B-1, B-2 are frictional engagement elements which changed state relative to one another. In changing the state of the frictional engagement elements, a precise concurrent control for the engagement pressure and the disengagement pressure of the hydraulic servos which control the brakes is needed. To perform the control, additional control valves are needed and the hydraulic circuit is complicated. In this embodiment, the engagement direction of the one-way clutch F-1 is set to be same direction as the supporting direction for the reaction torque in the first speed. As such, the one-way clutch F-1 operates to perform substantially the same function as the engagement of the brake B-2 by the reaction torque received by the carrier C2 (C3) being reversed between the first speed and the second speed. That is, in the first speed, the carrier C2 (C3) is engaged by the one-way clutch F-1 instead of the brake B-2. It should be noted that, in an engine coasting state in which the wheels drive the engine, the engagement of the brake B-2 is needed, as shown by the symbol ○ being enclosed in brackets in FIG. 3, to achieve an engine brake because the direction of the reaction force received by the carrier C2 (C3) is reversed from the case in the engine drive state. Therefore, it is possible to establish the first speed by engagement of the brake B-2 without arranging the one-way clutch F-1 for establishing the gear stage.

As shown with the clearance in the up/down direction between the symbols ○, showing the speed ratios of the ring gear R2, R3 on the velocity diagram in FIG. 4, each gear stage thus established has a proper speed step having a relatively equal interval between each gear stage. The relationship is shown with gear ratios in FIG. 3 by specifically setting values and showing quantitatively. In the case where the teeth number ratio $\lambda 1$ between the sun gear S1 and the ring gear R1 of the reduction planetary gear G1 equals 44/78, the teeth number ratio $\lambda 2$ between the sun gear S2 of the large sun gear side and the ring gear R2 (R3) of the planetary gear set G equals 36/78, and the teeth number ratio $\lambda 3$ between the sun gear S3 of the small sun gear side and the ring gear R3 of the planetary gear set G equals 30/78, each input/output gear ratio is:

first speed (1ST): $(1+\lambda 1)/\lambda 3 = 4.067$, second speed (2ND): $(1+\lambda 1)(\lambda 2+\lambda 3)/\lambda 3(1+\lambda 2) = 2.354$, third speed (3RD): $1+\lambda 1 = 1.564$, fourth speed (4TH): $(1+\lambda 1)/(1+\lambda 1-(\lambda 1*\lambda 3)) = 1.161$, fifth speed (5TH): $(1+\lambda 1)/(1+\lambda 1+(\lambda 1*\lambda 2)) = z0.857$, sixth speed (6TH): $1/(1+\lambda 2) = 0.684$, and reverse speed (REV):

$(1+\lambda 1)/\lambda 2 = 3.389$.

Then, the steps between the gear ratios are:

between the first and second speed: 1.73, between the second and third speed 1.51, between the third and fourth speed: 1.35, between the fourth and fifth speed: 1.35, and between the fifth and sixth speed: 1.25.

Figure 5:
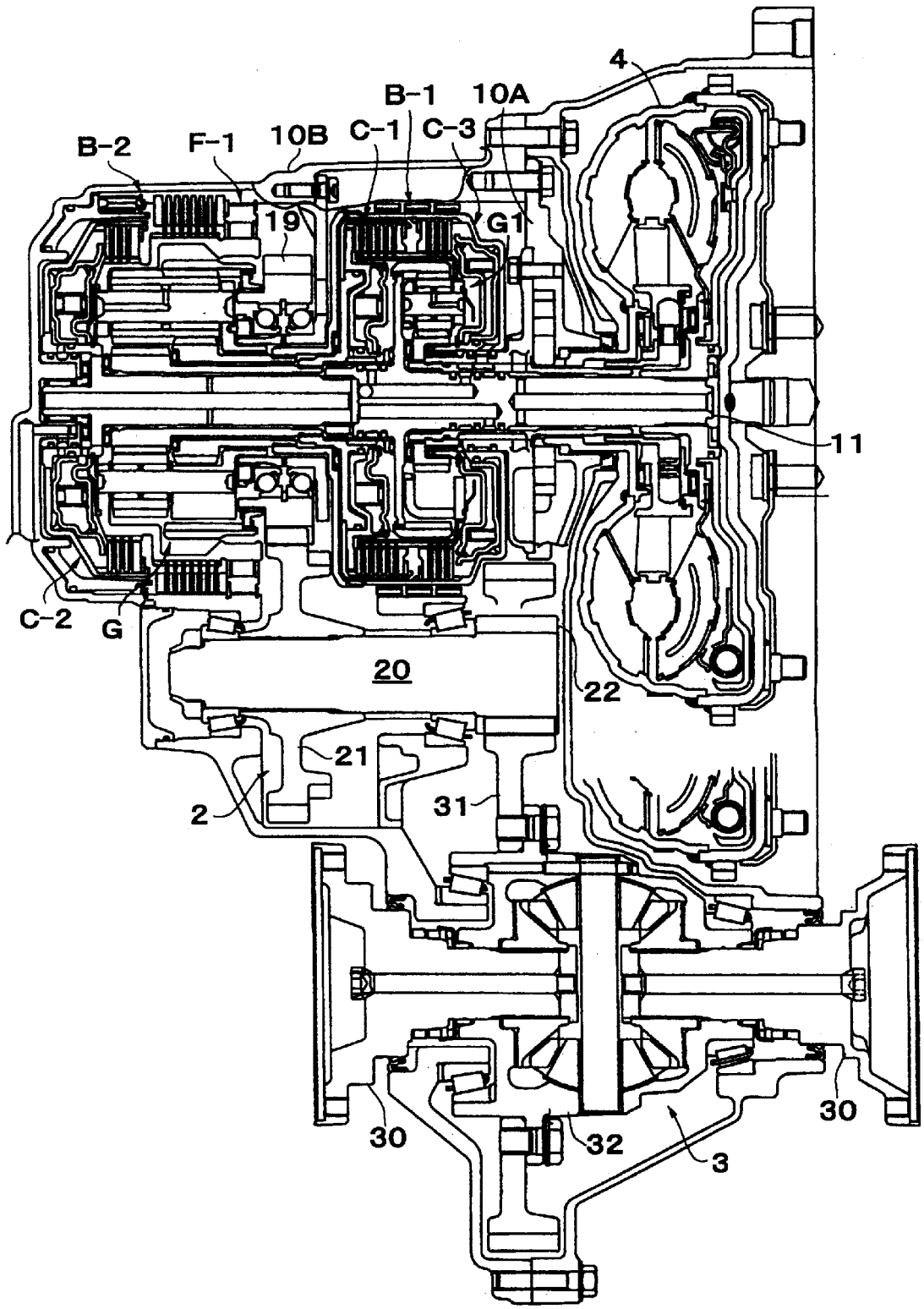
FIG. 5 is a cross sectional diagram illustrating the entire structure of the gear train.
Figure 6:
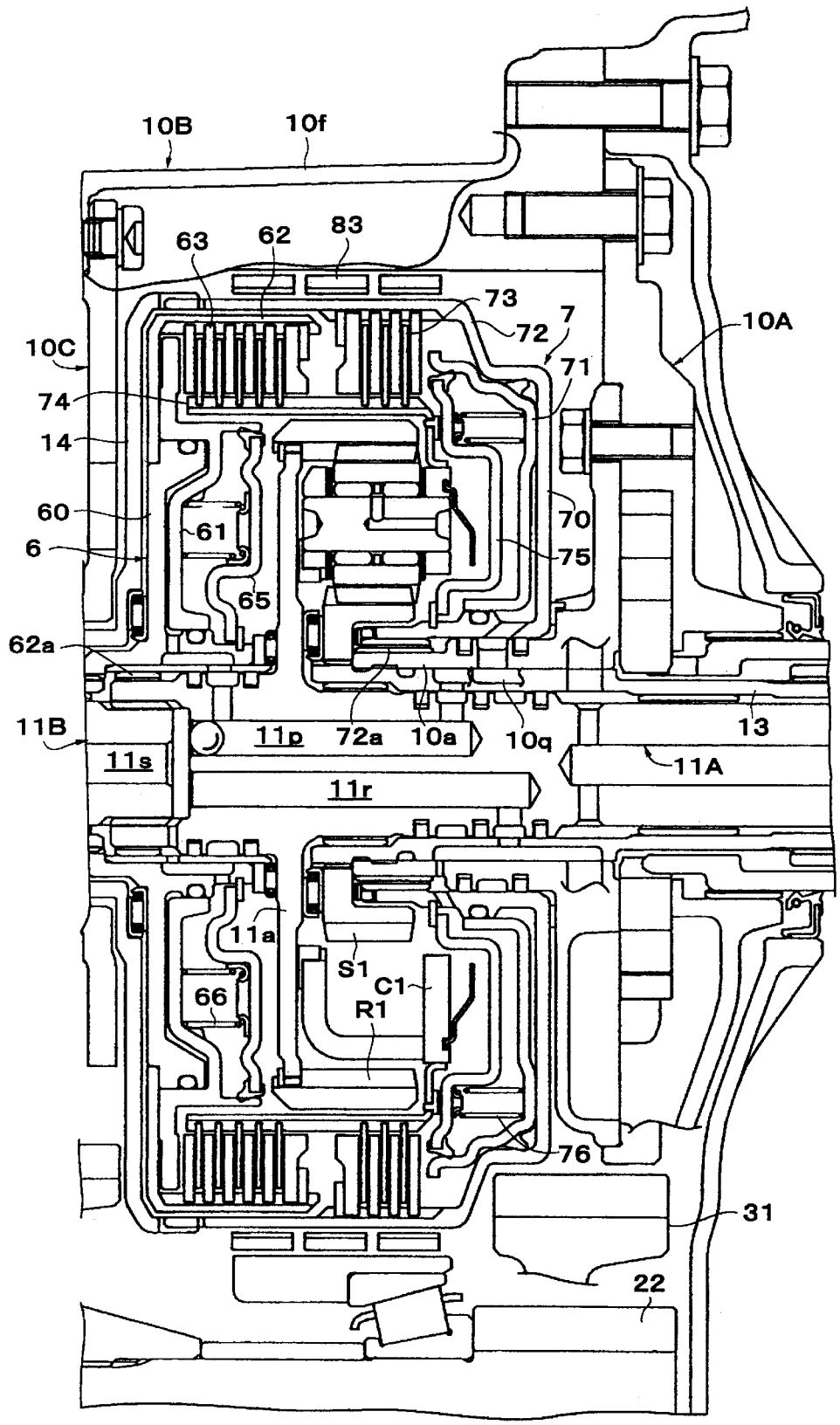
FIG. 6 is a magnified cross sectional diagram illustrating a front half portion of a main axis of the gear train.
Figure 7:
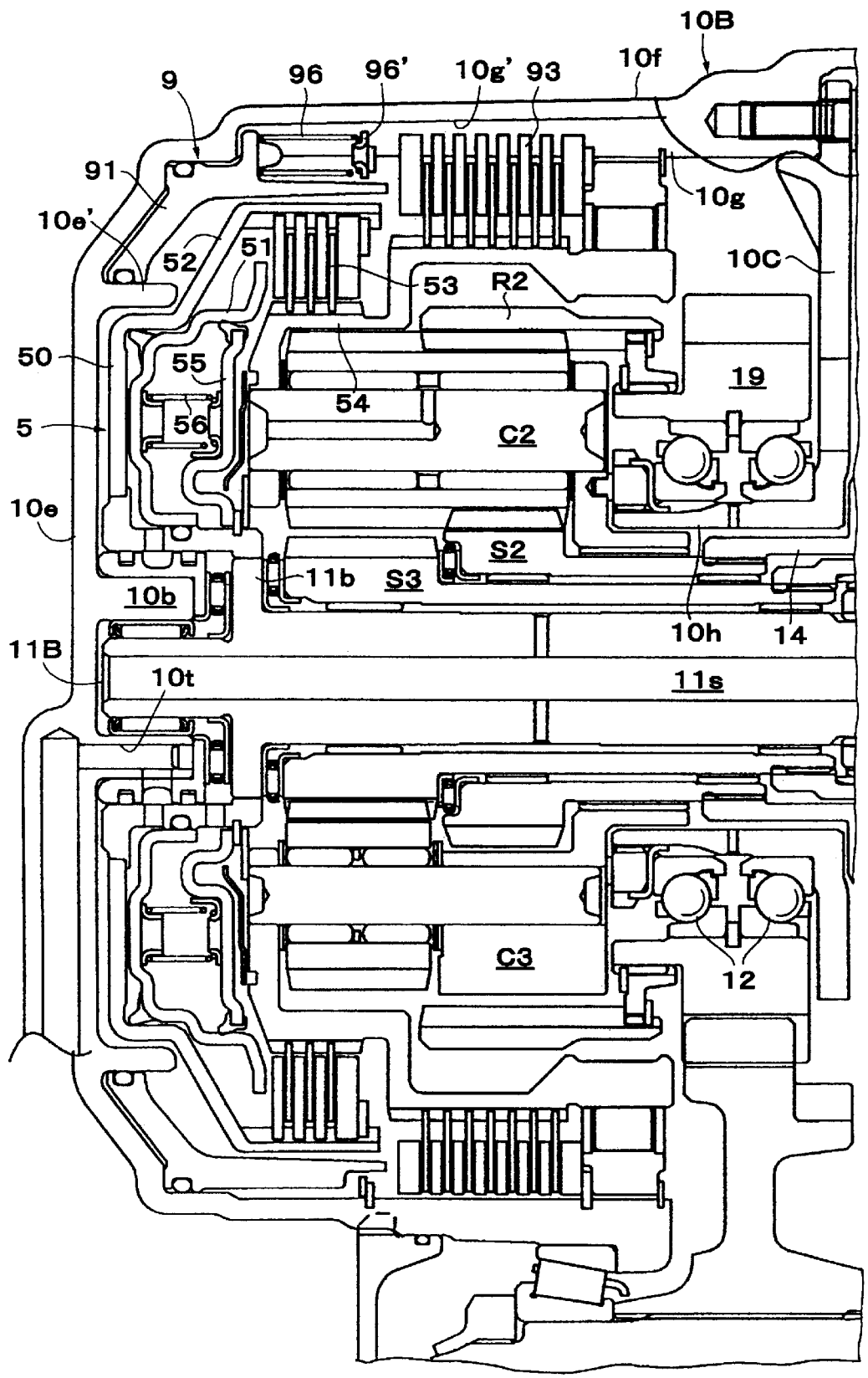
FIG. 7 is magnified cross sectional diagram illustrating a rear half portion of a main axis of the gear train.

FIG. 5 shows in further detail the structure of the automatic transmission using a simplified cross sectional view. FIGS. 6 and 7 are magnified partial views showing parts of FIG. 5. Each structural element, which was described before with reference to the schematic diagram, is identified with the same reference numeral or notation and the description is omitted. According to the detailed portions, which cannot be shown in the schematic diagram, the global positional relationship is described in reference to FIG. 5 and the detail of the each portion is described in reference to FIGS. 6 and 7. It should be noted that, in the specification, the terms clutch and brake, in case where the clutch and the brake are structured from multiple discs, generically indicate drums and hubs as connecting members connected to the input and output elements, a frictional member as the engagement/disengagement member, and hydraulic servos comprising cylinders connoted or integrated with the drums as the operational mechanism. It should be noted that the terms connotation and integration mean connection.

The transmission case 10 is structured from a case mainframe 10B comprising a surrounding wall portion 10*f* having a tapered shape, in which a diameter of the front side is larger than a diameter of the rear side. A front end wall 10A is structured from an oil pump body closing an opening at the front end and an oil pump cover fixed thereon and fixed on the case mainframe with a bolt. A support wall 10C is fixed on the axially center portion of the case mainframe 10B with a bolt. A spline 10*g* is formed from the opening at the front end to almost a rear end wall portion 10*e* on the inner surface of the surrounding wall portion 10*f* of the mainframe 10B. A rear side boss portion 10*b*, which extends toward the front side from the rear end wall portion, supports the rear end of the input shaft 11. A cylindrical wall 10*e'* structuring an inner wall of a cylinder of a hydraulic servo of the brake B-2 is formed on the rear end wall portion 10*e*. A front side boss portion 10*a* structured from a boss portion and a projection of a sleeve shaft 13 is formed on the front end wall 10A. The boss portion extends toward the rear side from the oil pump cover, the sleeve shaft 13 is inserted into the boss portion, and the projection is extended into the inside of the transmission case 10. Further, a center boss portion 10*h* extends toward the rear side from the inner portion of the support wall 10C. The center boss portion 10*h* provides a supporting portion for the counter drive gear 19.

The input shaft 11 is divided into a front portion and a rear portion which are two shafts 11A, 11B to accommodate assembly. The two shafts 11A, 11B are integrally connected with each other with a spline engagement. A shaft hydraulic path 11*r*, for applying a lubrication pressure, and a shaft hydraulic path 11*p* for applying servo pressures are formed in the shaft front half portion 11A. A shaft hydraulic path 11*s*, for a lubrication pressure, is formed in the shaft rear half portion 11B. Further, a flange 11*a* is formed on the outer surface of the shaft front half portion 11A at the rear end portion, and a flange 11*b* is formed on the outer surface of the shaft rear half portion 11B at the rear end portion. The shaft front half portion 11A is supported by a sleeve shaft 13, which structures the front boss portion 10*a*, through bushes at an internal position of an oil pump arrangement position and a position just before the flange 11*a*. The shaft rear half portion 11B is supported in the radial direction by a spline engagement with the shaft front half portion 11A at the front end and by the rear side boss portion 11*b* of the case 10 through a bearing at the rear end. The shaft front half portion 11A and the shaft rear half portion 11B are supported in the axial direction by thrust bearings which are inserted between the front ends of the boss portions and the flanges 11*a*, 11*b* adjoining with the supporting portion.

The planetary gear set G is arranged in the outer position of the shaft rear half portion 11B of the input shaft 11. Both ends of the sun gear S3 are supported by the shaft rear half portion 11B through bushes at the gear portion and the extension shaft portion individually. Both ends of the sun gear S2 are supported by the extension shaft portion of the sun gear S3 through bushes at the gear portion and the extension shaft portion. The carrier C2 (C3) is supported by the extension shaft portion of the sun gear S2 through a bush at the front end portion. The ring gear R2 is supported by the counter drive gear 19 with a spline connection through a flange member. The extension shaft portion of the sun gear S2 of the planetary gear set G is connected to a power transmission member 14 with a spline engagement, and the power transmission member 14 is connected to an end of an outer side cylindrical portion of a drum 72 of the third clutch C-3 with an end surface engagement. The extension shaft portion of the sun gear S3 is connected to an extension shaft portion of a cylinder 60 of the hydraulic servo of the first clutch C-1 with a spline engagement. The carrier C2 (C3) is connected to a member which is fixed on the rear end of the carrier C2 (C3) and structured by integrating a hub 54 of the second clutch C-2, which extends toward the front side at the outer position of the planetary gear set, a hub of the second brake B-2 and an inner race of the one-way clutch F-1. Further, the ring gear R2 is connected to the counter drive gear 19 through the connecting member as mentioned above.

In the reduction planetary gear G1, a sun gear S1, as a reaction element, is fixed with a spline engagement on the front boss portion structured from the rear end portion of the sleeve shaft 13. The sleeve shaft 13 is engaged and fixed to the inner surface of the oil pump cover. The sleeve shaft 13 fixes a stator of a torque converter through a one-way clutch on the oil pump cover at the front end portion of the sleeve shaft 13. The ring gear R1, as the input element, is connected with a spline engagement to the outer surface of the flange portion 11a of the input shaft 11. The reduction planetary gear G1 is arranged between the third clutch C-3 and the first clutch C-1, specifically, between the hydraulic servos of the clutches. A carrier C1, as the output element, is fixed, at the front end side, to a common hub 74, which is mentioned later, of the first and third clutches C-1, C-3.

Next, the hydraulic servos 6, 7 of the first and third clutches C-1, C-3 are arranged in both sides of the reduction planetary gear G1 so that the hydraulic servos 6, 7 are opposite each other. That is, the apertures of the cylinders 60, 70 of the hydraulic servos are opened to the reduction planetary gear G1 individually. The hydraulic servo 6 of the first clutch C-1 is rotatably supported by a supporting portion 62a on the outer surface of the rear end portion of the shaft front half portion 11A of the input shaft 11. The hydraulic servo 6 of the first clutch C-1 is structured from the cylinder 60 of which a drum 62 is fixed on the outer surface, a piston 61 slidably inserted in the cylinder 60, a cancel plate 65 arranged for canceling a centrifugal pressure operated at the back surface of the piston 61, and a return spring 66. The servo pressure is applied to/drained from the hydraulic servo 6 through the shaft hydraulic path 11p, which is formed in the shaft front half portion 11A of the input shaft 11 and connected to the hydraulic path formed in the transmission case.

The cylinder 60 of the first clutch C-1 is arranged in the inner position of the frictional member 63 of the clutch, is connected to the extension shaft portion of the sun gear S3 of the planetary gear set G with a spline connection, and transmits power from the drum 62 of the first clutch C-1 to the sun gear S3 of the planetary gear set G. The cylinder 60 and the drum 62 connecting to the cylinder 60 are connected with a spline to the extension portion of the sun gear S3 in the inner side of the support 10C which is a supporting member for the counter drive gear 19 transmitting the output from the ring gear R3 of the planetary gear set G to the counter shaft 20.

According to the structure, the cylinder 60 of the first clutch C-1 is used for transmitting power from the first clutch C-1 to the sun gear S3 of the planetary gear set G so that a particular member for power transmission does not need to be arranged in the axial direction. Therefore, the axial length is shortened. Further, the supporting portion 62a, which supports the drum 62 through the hydraulic servo 6 of the first clutch C-1, is arranged in the inner position of the power transmission member 14 and has a width, corresponding to the thickness of the cylinder 60, such that a substantial arrangement space is not needed in the axial direction. Therefore, the axial length of the hydraulic servo 6 is shortened to an axial length corresponding to a clearance between arrangement positions of seal rings which seal the application path for the servo pressure applied to the hydraulic servo at the both sides in the axial direction. As a result, the axial length of the shift mechanism is shortened and the clutch drum 62 is certainly supported.

The hydraulic servo 7 of the third clutch C-3 is rotatably supported through a bush by a supporting portion 72a on the outer surface of the front boss portion 10a. The hydraulic servo 7 of the third clutch C-3 is structured from the cylinder 70 of which a drum 72 is formed at the outer side by increasing the diameter, a piston 71 is slidably inserted in the cylinder 70, a cancel plate 75 arranged for canceling the centrifugal pressure operating on the piston 71, and a return spring 76. The servo pressure is applied to/drained from hydraulic servo 7 through a hydraulic path 10q formed in the front boss portion 10a.

The frictional member 63 of the first clutch C-1 and the frictional member 73 of the third clutch C-3 are aligned in the radially outer position of the reduction planetary gear G1. The frictional member 63 of the first clutch C-1 is structured from a multiple disc frictional element, which is engaged with the hub 74 via a spline engagement at the inner surface, and separator plates, which are engaged with the drum 62 with a spline engagement at the outer surface. The frictional member 63 transmits a torque from the hub 74, as the input side member, to the drum 62, as the output side member, when the frictional member 63 is engaged by pinching with a backing plate fixed on an end of the drum 62 and the piston 61, which slides within the cylinder 60 upon application of hydraulic pressure to the hydraulic servo 6.

The frictional member 73 of the third clutch C-3 is structured from a multiple disc frictional element, which is engaged with the hub 74 via a spline engagement at the inner surface, and separator plates, which are engaged with the drum 72 via a spline engagement at the outer surface. The frictional member 73 transmits a torque from the hub 74, as the input side member, to the drum 72, as the output side member, when the frictional member 73 is engaged by pinching with a backing plate fixed on an end of the drum 72 and the piston 71, which slides from the cylinder 70 upon application of hydraulic pressure to the hydraulic servo 7.

In this structure, the two clutches C-1, C-3, which are the first and third clutches C-1, C-3, transmit the reduction torque outputted from the reduction planetary gear G1 to the planetary gear set G and are arranged in a position close to the reduction planetary gear G1. Further, the reduction planetary gear G1 is surrounded by the frictional members 63, 73 arranged in a radially outer position and the hydraulic servos 6, 7 are arranged at both sides. Therefore, the power is transmitted from the reduction planetary gear G1 to the clutches C-1, C-3 in the area between the clutches C-1, C-3. That is, the power is directly transmitted from the carrier C1 to the common hub 74 of both clutches C-1, C-3 without arranging a particular member and, one of the powers from the two clutches C-1, C-3 is transmitted to the planetary gear set G through the first hydraulic servo 6. Therefore, the number of members, which need to be supported on a shaft for transmitting power and superposed in the axial direction, are reduced by the direct power transmission from the reduction planetary gear G1 to both clutches C-1, C-3 and the power transmission using the hydraulic servo 6 of the first clutch. As a result, the axial length of the shift mechanism is shortened, and the high torque transmission member is shortened. Further, a multiple shaft structure, in which a shaft for transmitting power is arranged in the inner position of the planetary gear set G, and which is needed in a complicated arrangement of the input routes of the reduction torque and the non-reduction torque to the planetary gear set G, is avoided by the integration of the transmission routes of the reduction torque. Therefore, the transmission is lightened and made compact.

According to the connecting portion of the divided input shaft 11 and the connection between the first clutch C-1 and the third clutch C-3 and the planetary gear set G through the clearance between the outer surface of the input shaft 11 and the inner surface of the counter drive gear 19, the spline connecting portion between the input shaft front half portion 11A and the rear half portion 11B, the spline connecting portion between the extension shaft portion of the sun gear S3 and the extension shaft portion of the cylinder 60, and the spline connecting portion between the extension shaft portion of the sun gear S2 and the power transmission member 14 are arranged in positions which are not radially superposed on each other. Therefore, an enlargement, which normally occurs by radially superposing the three connecting portions is prevented, and the structure is compact.

On the other hand, the hydraulic servo 5 of the second clutch C-2 is arranged in the rear side of the planetary gear set G, that is, in the hindmost position of the shift mechanism, connected to the flange 11*b* of the input shaft rear half portion 11B at the inner surface, and structured from the cylinder 50 of which a drum 52 is formed at the outer side by increasing the diameter, a piston 51 is slidably inserted in the cylinder 50, a cancel plate 55 is arranged for canceling a centrifugal pressure, and a return spring 56. The servo pressure is applied to/drained from the hydraulic servo 5 through a hydraulic path 10*t* formed in the rear side boss portion 10*b*.

The frictional member 53 of the second clutch C-2 is structured from a multiple disc frictional element, including frictional discs engaged with the hub 54 via a spline engagement at the inner surface, and separator plates, which are engaged with the drum 52 via a spline engagement at the outer surface. The frictional element is engaged with the hub 54 in a position which is at the rear side of the radially outer position of the planetary gear set G and in which the ring gear 2 (R3) is not arranged. The frictional member 53 transmits a torque from the drum 52, as the input side member, to the hub 54, as the output side member, when the frictional member 53 is engaged by pinching with a backing plate fixed on an end of the drum 52 and the piston 51, which slides from the cylinder 50 upon application of hydraulic pressure to the hydraulic servo 5.

According to the second clutch C-2 and the second brake B-2, the frictional member 53 of the second clutch C-2, which has a smaller torque capacity than the first and third clutches C-1, C-3 because the non-reduction torque is transmitted to the frictional member 53, is arranged in the radially outer position of the planetary gear set G and enlarged to have a large capacity at the frictional member side. A hydraulic servo 9 of the second brake B-2 is arranged in the outer position of the hydraulic servo 5, which is downsized because the frictional member has the large capacity, of the second clutch C-2. Therefore, both hydraulic servos 5, 9 are arranged by effectively using space in the radial direction. As a result, the axial length of the transmission is further shortened.

The first brake B-1 is a band brake. The brake band 83 of the band brake constricts the outer surface of the drum 72 of the third clutch C-3 as an engagement surface. Therefore, the first brake B-1 is arranged without taking any axial space and the radial size of the transmission is barely increased. The hydraulic servo of the band brake B-1 is arranged in an axial position, which is same as the axial position of the brake band 83, and extends in a tangential direction to the drum 72. The hydraulic servo is omitted from the illustration in the figures. Thus, the clutch drum 72, which supports the frictional member 73 of the third clutch C-3 arranged in the outer position of the reduction planetary gear G1, is the drum of the first brake B-1 and the supporting portion 72*a* for the drum is arranged in a radial position of the sun gear S1 of the reduction planetary gear G1 so that a radial space for a brake drum 72 and an axial space for supporting the drum 72 are reduced. Therefore, the diameter and the axial length of the transmission are shortened. Further, the drum 72, which is constricted by the band 83, is supported on the front boss portion 10*a* of the case in the inner position of the constricting portion so that a steady brake performance is achieved by using the clutch drum 72.

The second brake B-2 is a multiple disc of the type of each clutch C-1 through C-3. The frictional member 93 of the second brake B-2 is arranged at the front portion at the radially outer position of the planetary gear set G. The hydraulic servo of the second brake B-2 is arranged on the rear end wall portion 10*c* of the case 10 in the radially outer position of the hydraulic servo 5 of the second clutch C-2 and can push the frictional member 93 of the second brake B-2 through the radially outer position of the frictional member 53 of the second clutch C-2. The second brake B-2 is axially aligned with the one-way clutch F-1. The hydraulic servo 9 of the second brake B-2 is formed by inserting a piston 91 into the rear end wall portion 10*e* of the transmission case 10. Then, the cylinder is integrated with the case 10. In further detail, the outer peripheries of the separator plates of the frictional member 93 are engaged with the surrounding wall portion 10*f* of the case 10 via a spline engagement, and the inner peripheries of the frictional discs are engaged with a brake hub integrated with the clutch hub 54 via a spline engagement. Further, the hydraulic servo 9 is structured from the cylinder and the cylindrical piston 91 is inserted into the cylinder. The cylinder is structured from the surrounding wall portion 10*f*, rear end wall portion 10*c* and a cylindrical wall 10*e'* axially extended from the rear end wall portion 10*e* of the case 10. The extension portion of the piston 91 goes through the radially outer position of the drum 52 of the second clutch C-2 and is faced to the frictional member 93. A return spring 96 and the receiving member 96' are arranged in the trough portion 10*g'* of the spline 10*g* supporting the frictional member 93 of the second brake B-2.

Thus, the return spring 96 and the receiving member 96' are arranged in the trough portion 10*g'* of the spline 10*g* of the case 10 so that a substantial space for the return spring 96 is not needed. Therefore, the diameter of the transmission case is decreased.

Next, according to the support of the counter drive gear 19, the gear 19 is supported by a bearing 12 on a boss portion 10*h* extended to the rear side from inner portion of the support 10C structuring the supporting member. As shown in FIG. 5, a step portion is formed at the approximately intermediate portion of the case mainframe 10B by slightly increasing the diameter, and the outer side of the support 10C is fixed with bolts on the end surface of the spline formed on the step portion.

The shift mechanism is arranged on the input shaft 11 as mentioned above. As shown in FIG. 5, a differential drive pinion gear 22, which is engaged with a differential ring gear 31 of a differential unit 3, is arranged on the front end portion of the counter shaft 20. The differential drive pinion gear 22 is arranged in the radial position of the front end wall 10A in which a part of the oil pump body has a notch. According to the arrangement of the differential drive pinion gear 22 on the front portion, the front side of the counter shaft 20 is supported through a bearing on the case mainframe 10B at a position adjoining to the differential drive pinion gear 22. Then, according to this positional relationship, the hydraulic servo 7 of the third clutch C-3 is arranged in an axially aligned position with the differential ring gear 31. A portion of the frictional member 73 of the third clutch C-3, which is arranged in the radially outer position of the reduction planetary gear G1, is also arranged generally in an axially aligned position of a portion of the differential ring gear 31.

In this arrangement, the differential drive pinion gear 22 is arranged at the front side so that the differential ring gear 31 and the frictional member 73 of the third clutch C-3 are not superposed in the radial direction with each other. Therefore, the limitation of the radial size of the frictional member 73 is reduced so that the needed capacity is maintained. Further, even if the hydraulic servo 7 of the third clutch C-3 is downsized because of shortening the clearance between the axis or an interference with the differential ring gear 31 of which the diameter is increased, enough clutch capacity is maintained. As a result, in this structure, in case a constant clearance is maintained between the input shaft 11 and the differential shaft 30, a degree of freedom for setting the differential ratio is increased by increasing a degree of freedom for selecting the diameter of the differential ring gear. Further, it is easy to shorten the clearance between the axis.

Figure 8:
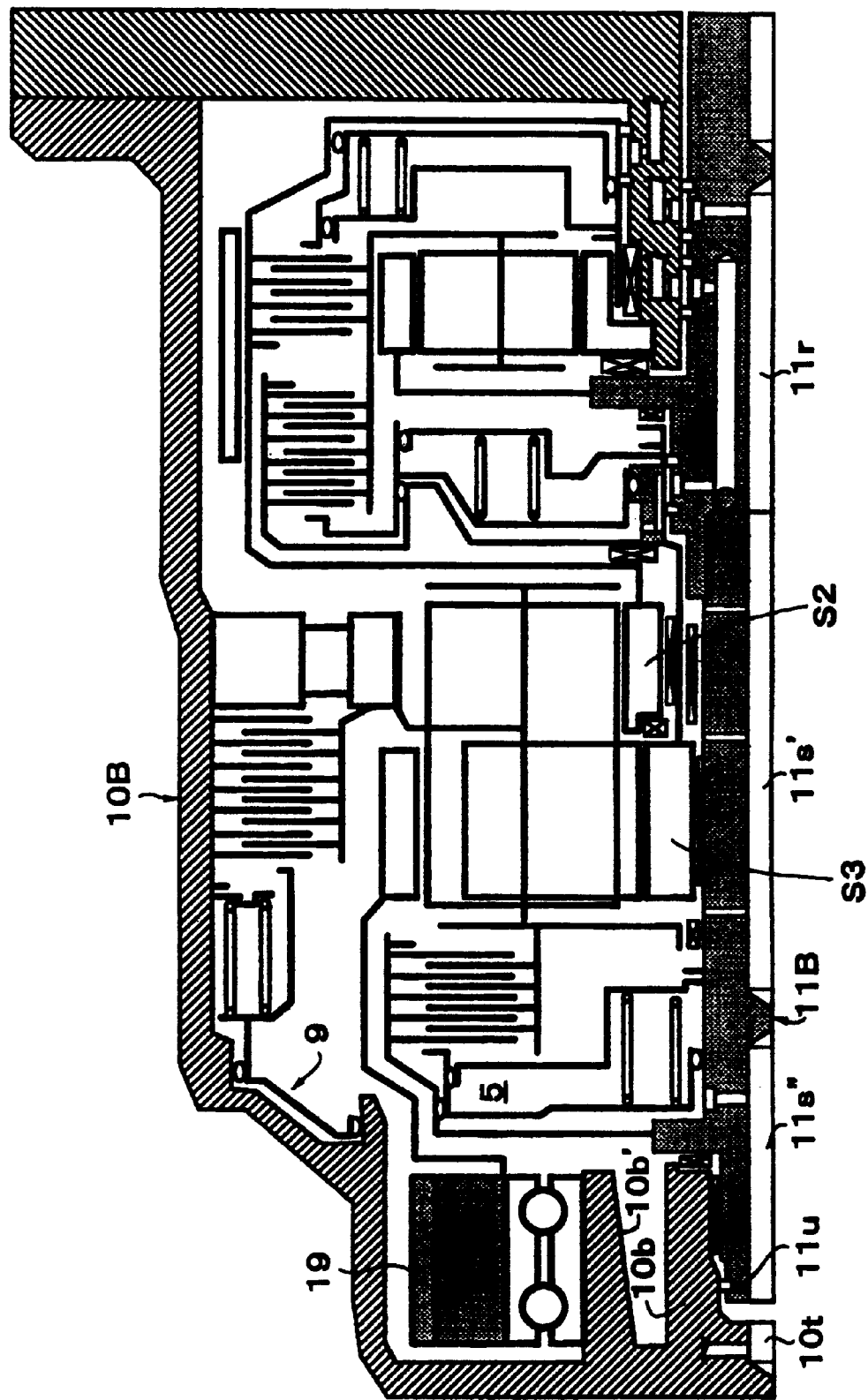
FIG. 8 is an axial cross sectional diagram illustrating a second embodiment.

Next, FIG. 8 illustrates, with a simplified cross-sectional view, the second embodiment, in which the each element arrangement is substantially the same as the first embodiment. Only the counter drive gear 1g is moved to the hindmost position of the transmission. In this embodiment, the hydraulic servo 5 of the second clutch C-2 is supported on the outer surface of the input shaft front half portion 11B, and the counter drive gear 19 is supported on a second rear side boss portion 10b', having a large diameter, of the case mainframe 10B. Further, the cylinder of the hydraulic servo 9 of the second brake B-2 is formed on a step portion of the case mainframe 10B.

In this second embodiment, the hydraulic servo 5 of the second clutch C-2 is supported on the input shaft rear half portion 11B. Therefore, the structure of the shaft hydraulic path in the input shaft is changed for applying the servo pressure to the hydraulic servo 5. That is, the shaft hydraulic path in the input shaft rear half portion 11B is divided into front and back sections. A shaft hydraulic path 11s' at the front side is connected to the transmission case hydraulic path at the front boss portion the same as the first embodiment. A shaft hydraulic path 11s" in the rear side is connected to the case hydraulic path 10t which is formed in the rear end wall portion 10e side of the transmission case main frame 10B. A seal ring 11u is arranged between the outer surface of the input shaft rear half portion 10B and the rear boss portion 10b for sealing the servo pressure.

In the second embodiment, the axial size of the transmission is reduced by eliminating the support 10C. Further, the output side members of the first and third clutches C-1, C-3 are directly connected to both elements S2, S3 of the planetary gear set G. Therefore, a high torque transmission route in the output side of the first and third clutches C-1, C-3 is shortened in addition to the shortening of the high torque transmission route in the input side. Further, in this embodiment, the diameter of the rear end portion of the transmission is reduced by reducing the diameter of the rear end portion of the case main frame 10B according to the diameter of the counter drive gear 19. That is, the diameter of the rear end portion of the transmission, which is liable to interfer with, that is, be obstructed by, vehicle side members when the transmission is mounted on a vehicle, is reduced. Therefore, the transmission mounting characteristics are improved. Further, the shaft hydraulic path 11s'" in the rear side of the input shaft rear half portion 11B is opened at the shaft end, then connected to the case hydraulic path lot in the rear boss portion 10b. Therefore, the increase in the number of seal rings, according to the application of the servo pressure through the input shaft to the hydraulic servo 5 of the second clutch C-2, is minimized. Here, in case the hydraulic paths are connected at the outer surface of the shaft, a pair of seal rings arranged in front and back sections of the hydraulic path connecting portion is needed.

Figure 9:
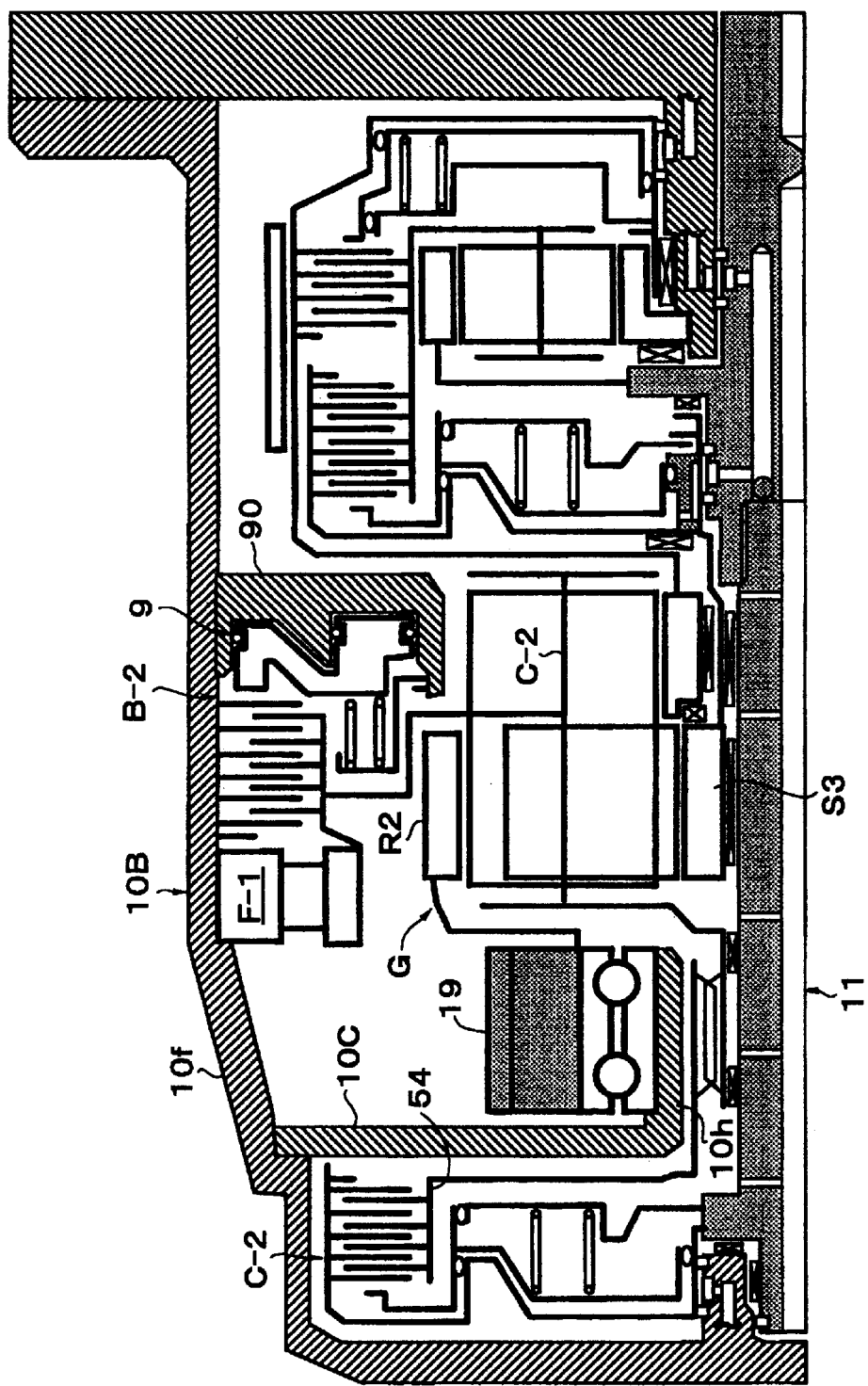
FIG. 9 is an axial cross sectional diagram illustrating a third embodiment.

FIG. 9 illustrates, with a simplified cross sectional view, the third embodiment, in which each element arrangement is substantially same as the first embodiment. In this embodiment, the counter drive gear 19 is supported on a boss portion 10h and is arranged between the planetary gear set G and the second clutch C-2. The boss portion 10h extends toward the front side from a support 10C fixed on the surround wall 10f of the case mainframe 10B. The hub 54 of the second clutch C-2 is extended toward the front side parallel to the input shaft 11. The shaft supporting portion of the carrier C2 (C3) of the planetary gear set G is extended toward the rear side parallel to the input shaft 11. These axial extension portions are connected with a spline engagement in the inner position of the support 10C supporting the counter drive gear 19. The hydraulic servo 9 of the brake B-2 comprises an independent cylinder 90 fixed on the surround wall 10f of the case mainframe 10B. In this case, the positions of the brake B-2 and the one-way clutch F-1 are exchanged, the ring gear R2 of the planetary gear set G is moved to a radially aligned position of the small sun gear S3, and the cylinder 90 is arranged in a radially outward position of the planetary gear set G in which the ring gear R2 is not arranged.

In the third embodiment, the second clutch C-2, having small load torque, is positioned in the hindmost position, and the elements having a large load torque are integrally arranged to the relatively front side. Therefore, it is easy to maintain the rigidity of the transmission. Further, the relationship of the hydraulic pressure application is the same as with the first embodiment. Therefore, the sliding resistance created by the seal rings is reduced as compared with the second embodiment.

Figure 10:
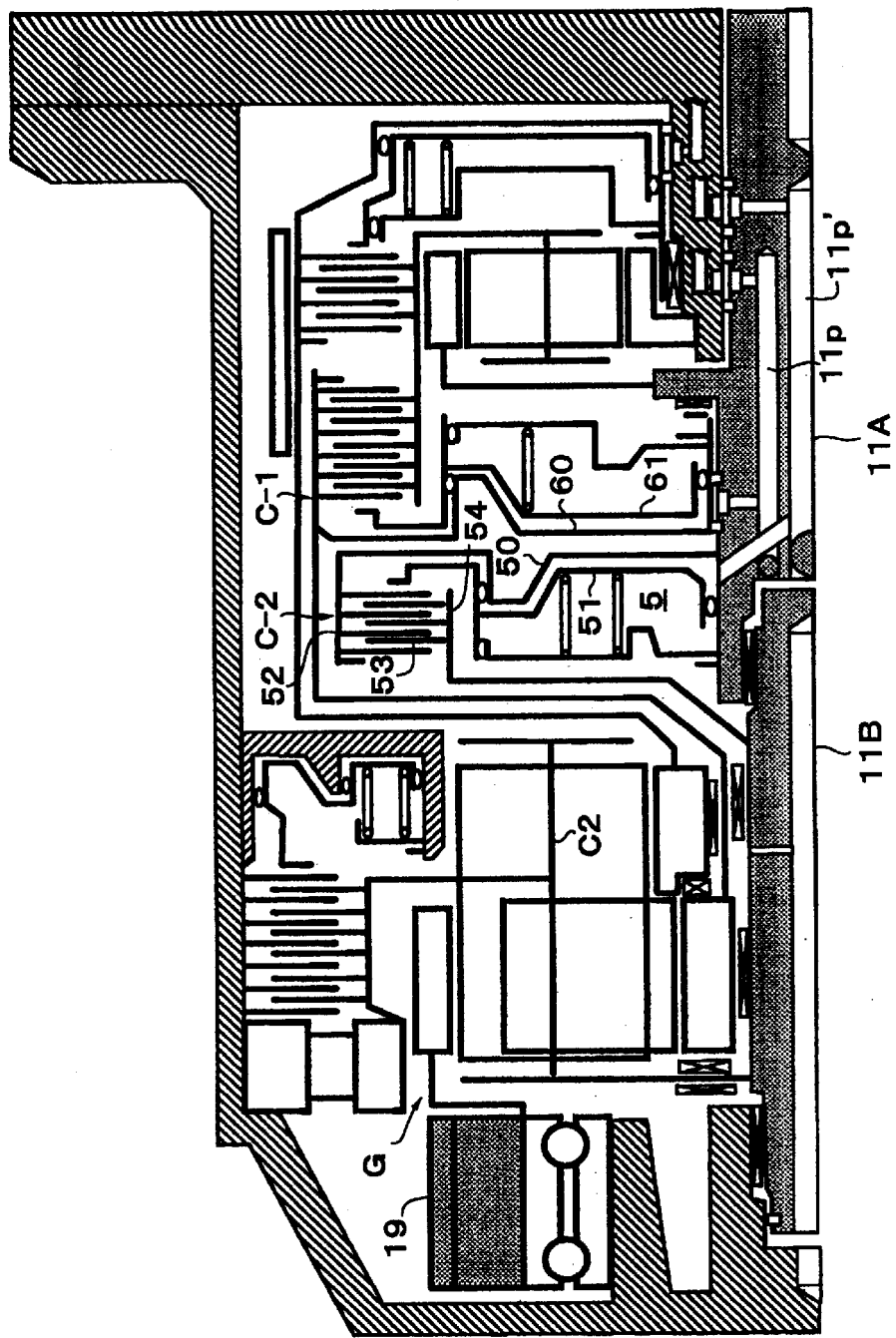
FIG. 10 is an axial cross sectional diagram illustrating a fourth embodiment.

FIG. 10 is a cross sectional view simply illustrating the fourth embodiment in which the counter drive gear 19 is arranged in the hindmost portion, the same as the second embodiment, and the second clutch C-2 is arranged between the planetary gear set G and the first clutch C-1. The fourth embodiment is different from the previously described embodiments. The input shaft front half portion 11A and the rear half portion 11B are rotatable relative to each other. The front end of the input shaft rear half portion 11B is supported through a bearing by the front half portion 11A. The hydraulic servo 5 of the second clutch C-2 is arranged on the rear end portion of the input shaft front half portion 11A. The cylinder 50 of the hydraulic servo 5 is structured from the outer surface of the input shaft front half portion 11A and a plate member having a similar cross sectional shape as the cylinder 60 of the first clutch C-1 and fixed on the outer surface of the input shaft front half portion 11A. The clutch drum 52 is connected to the outer portion of the cylinder 50. The piston 51 of the hydraulic servo 5 has a similar cross sectional shape as the piston 61 of the first clutch C-1. The clutch hub 54, engaged with the inner portion of the frictional member 53, is connected to the front end portion of the input shaft rear half portion 11B. The carrier C2 of the planetary gear set G is connected to the rear end portion of the input shaft rear half portion 11B. A shaft hydraulic path 11p' for applying the servo pressure to the second clutch C-2 is formed in the input shaft front half portion 11A in parallel with the shaft hydraulic path 11p for applying the servo pressure to the first clutch C-1.

In the embodiment, the hydraulic servo 5 of the second clutch C-2 is arranged on the shaft so that the pressure receiving area is radially enlarged toward the inner direction. Further, only the output side members of the first and third clutches C-1, C-3 are extended in the radial outer space of the second clutch C-2 so that the limitation on the size is alleviated. Therefore, in the embodiment, the capacity of the hydraulic servo 5 of the second clutch C-2 is obtained by enlarging the pressure receiving area toward the inner direction, and the number of structural elements is reduced by increasing the diameter of the frictional member 53. As a result, the axial size of the second clutch is reduced. The axial size of the transmission is also reduced as shown by comparing the figure of this embodiment and the figures of the aforementioned embodiments which have the same reduction rate.

The first and third clutches C-1, C-3 and the reduction planetary gear G1, which are generically shown as a large torque transmission group, are arranged in the engine connecting side of the transmission in the aforementioned embodiments. They can be arranged in the rear end portion of the transmission during which the connection relationships and the basic structure are maintained. However, other arrangements of the elements are possible.

Figure 11:
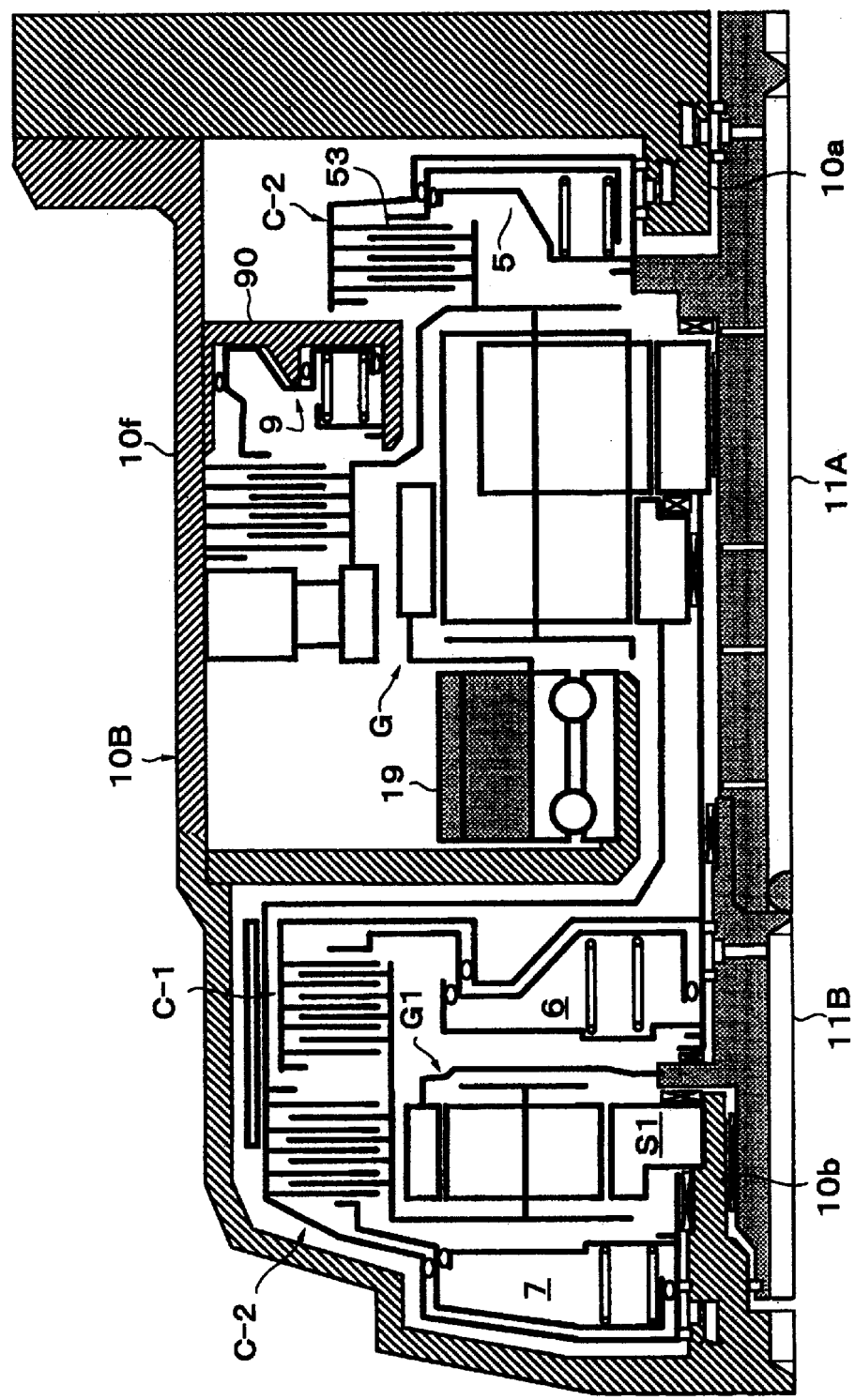
FIG. 11 is an axial cross sectional diagram illustrating a fifth embodiment.

FIG. 11 illustrates the fifth embodiment using a simplified cross sectional view. In the embodiment, the positions of the planetary gear set G, reduction planetary gear set G1, the three clutches C-1 through C-3 and the counter drive gear 19 are reversed relative to the first embodiment.

In the structure, the sun gear S1 of the reduction planetary gear G1 is fixed on the rear side boss portion 10b extending from the case mainframe 10B. The hydraulic servo 7 of the third clutch C-3 is also supported on the rear side boss portion 10b. The hydraulic servo 6 of the first clutch C-1 is supported on the input shaft rear half portion 11B. The hydraulic servo 5 of the second clutch C-2 is supported on the front boss portion 10a. The hydraulic servo 9 of the brake B-2 comprises an independent cylinder 90 fixed on the surround wall 10f of the case mainframe.

The second clutch C-2 has a small torque transmission capacity because the second clutch C-2 does not transmit the reduction torque. Therefore, the diameter of the frictional member 53 of the second clutch C-2 can be reduced. In the fifth embodiment, the second clutch C-2, which has the small diameter, is positioned in the mostly front side. Therefore, interference between the frictional member 53 and the differential ring gear 31 is reduced. As a result, the degree of freedom for setting the clearance between the main axis X and the differential axis Z, shown in FIG. 1, is increased. It is noted that the clearance is affected by the differential gear ratio.

Continuing on this point, the clutch C-2, which directly transmits the rotation of the input shaft 11 to the carrier C2 (C3), is not engaged in the forward first through third speeds and the reverse speed as mentioned before. Therefore, the clutch C-2 does not receive a stall torque, which is amplified from the engine torque transmitted from the torque converter 4, in a vehicle stop state. Further, in comparison with the other clutches C-1, C-3 in the velocity diagram of FIG. 4, the clutch C-2 does not receive the amplification torque amplified by the deceleration. Therefore, the clutch C-2 can be structured to have a smaller torque capacity in comparison with the clutches C-1, C-3. It is noted that the torque capacity is set by a diameter of the clutch and the number of frictional members. Therefore, in the axial positional relationship shown in FIG. 2, the diameter of the differential ring gear 31 can be increased by reducing the diameter of the clutch C-2 in the constant clearance between the main axis X and the differential axis Z.

In the structure, in which high torque transmission members are arranged in the rear end portion of the transmission as mentioned above, the positions of the remaining elements can be moved similarly.

Figure 12:
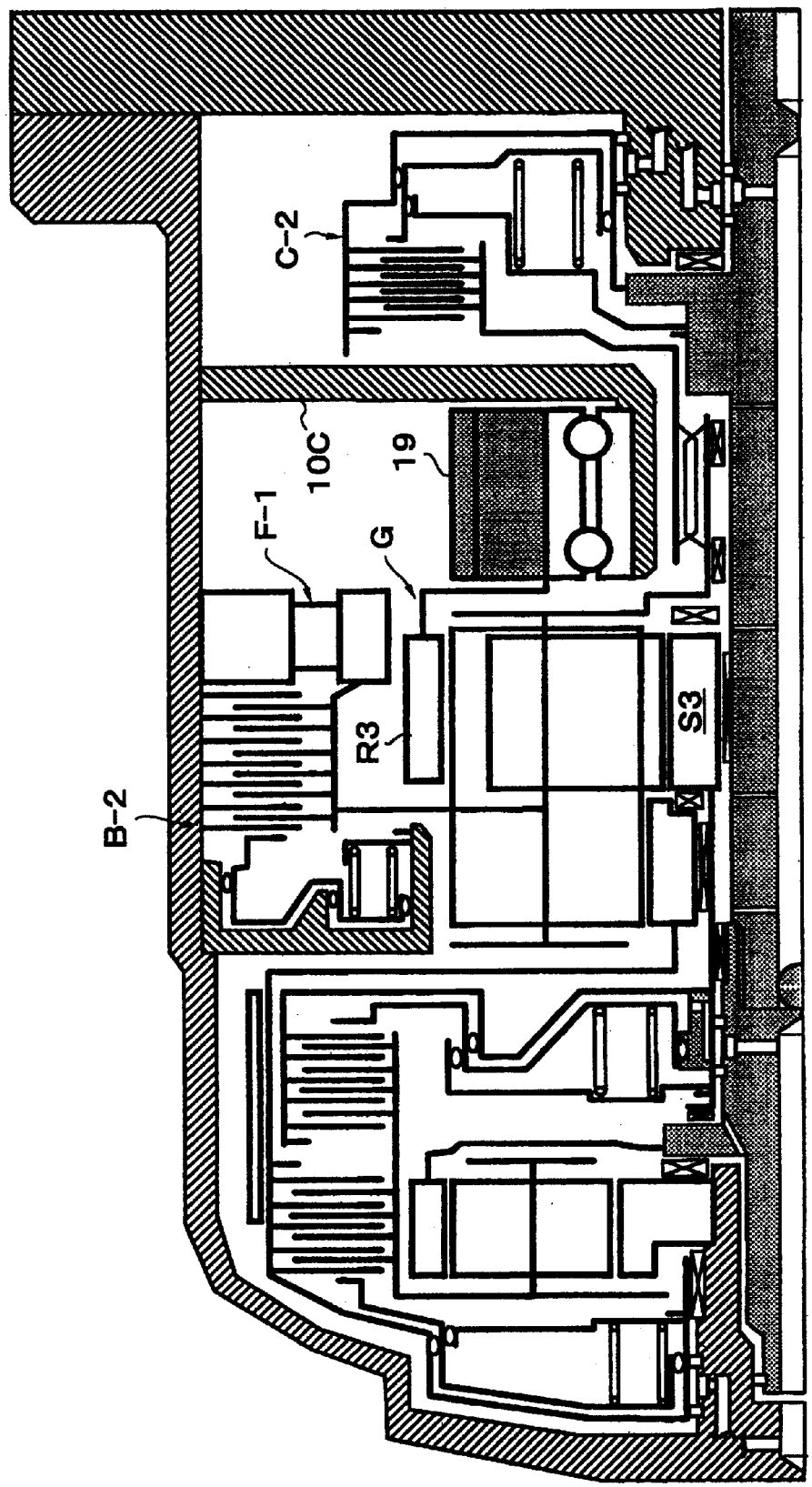
FIG. 12 is an axial cross sectional diagram illustrating a sixth embodiment.

FIG. 12 illustrates the sixth embodiment, in which the counter drive gear 19 is arranged between the planetary gear set G and the second clutch C-2, using a simplified cross sectional view. In the embodiment, the counter drive gear 19 is positioned at the small sun gear S3 side. Therefore, the ring gear R3 of the planetary gear set G is arranged at the small sun gear S3 side for the same reason as was the case in the fifth embodiment. Accordingly, the positional relationship between the second brake B-2 and the one-way clutch F-1 is reversed from the fifth embodiment.

In the sixth embodiment, the transmission route of the reduction torque is shorter than in the fifth embodiment because the transmission route is not extended in the inner space of the support wall 10C. Further, the counter drive gear 19 is close to the differential drive pinion gear 22, which is shown in FIG. 1, so that the axial length of the counter shaft 20, supporting the counter driven gear 21 and the differential drive pinion gear 22, is shortened and the weight of the shaft is lightened.

Figure 13:
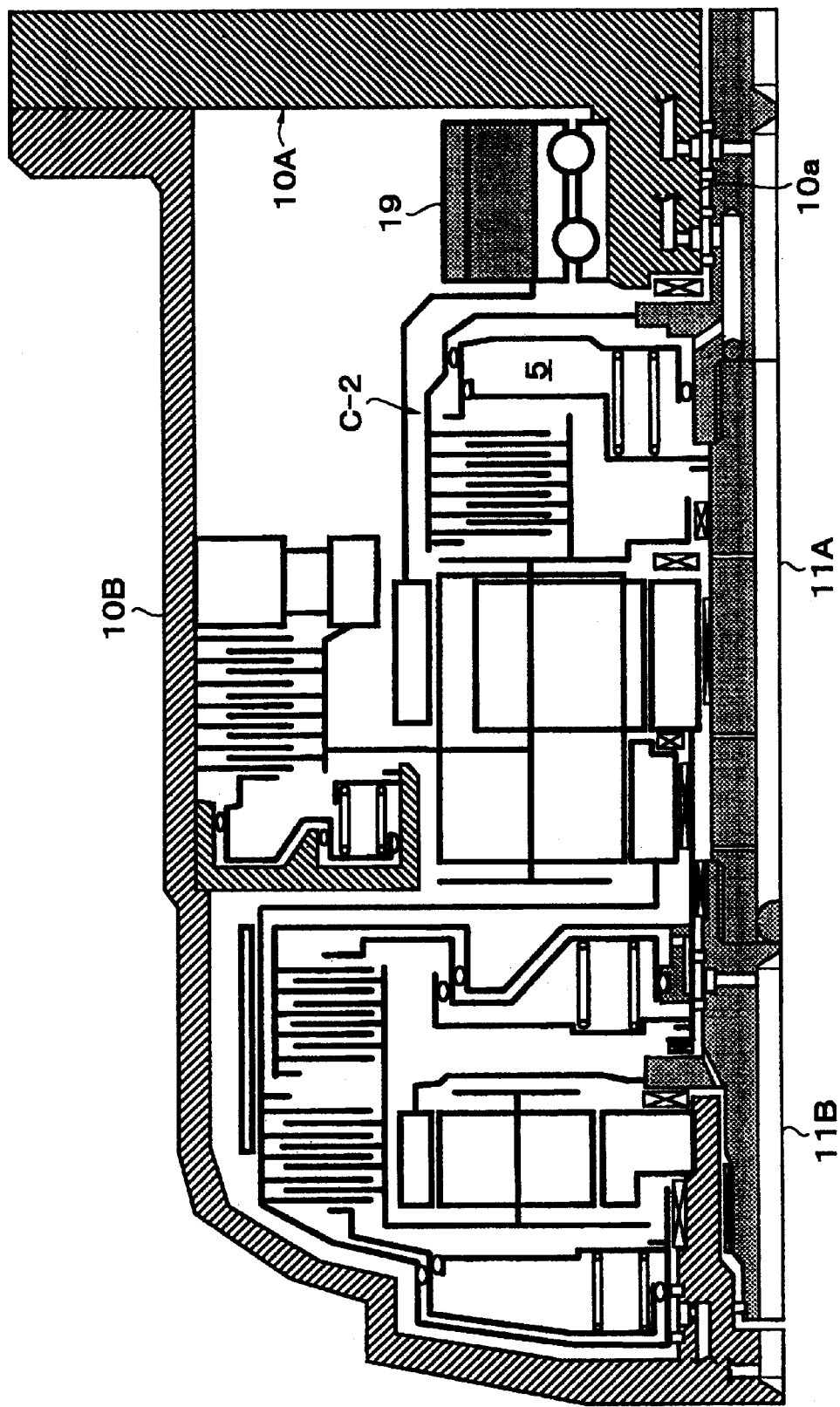
FIG. 13 is an axial cross sectional diagram illustrating a seventh embodiment.

Next, FIG. 13 is a cross sectional view simply illustrating the seventh embodiment in which the positions of the second clutch C-2 and the counter drive gear 19 are exchanged as compared with the sixth embodiment. In this embodiment, the counter drive gear 19 is directly supported on the front boss portion 10a of the transmission case, and the hydraulic servo 5 of the second clutch C-2 is supported on the input shaft front half portion 11A. Especially, in this embodiment, the shaft hydraulic path for applying the servo pressure to the second clutch C-2 and the shaft hydraulic path for applying the lubrication pressure are arranged in parallel with each other in the front portion of the shaft front half portion 11A. Therefore, the shaft front half portion 11A is structured by integrating two members to simplify assembly. Thus, the structure, in which the counter drive gear 19 is arranged in the mostly front portion of the shift mechanism, is adequate for a transaxle in which the second axis, shown in FIG. 1, is an idler shaft and a rotation is not decelerated at the second axis.

In this embodiment, the counter gear 19 is supported on the case front end wall 10A so that a support is not needed on the case mainframe 10B. Further, gear noise is reduced by arranging the counter drive gear 19, causing the gear noise, in the mostly front position of the transmission, in which it is tough to cause the noise, compared with the second and fourth embodiments, in which the counter gear 19 is supported on the case 10 (illustrated in FIGS. 8 and 10).

Figure 14:
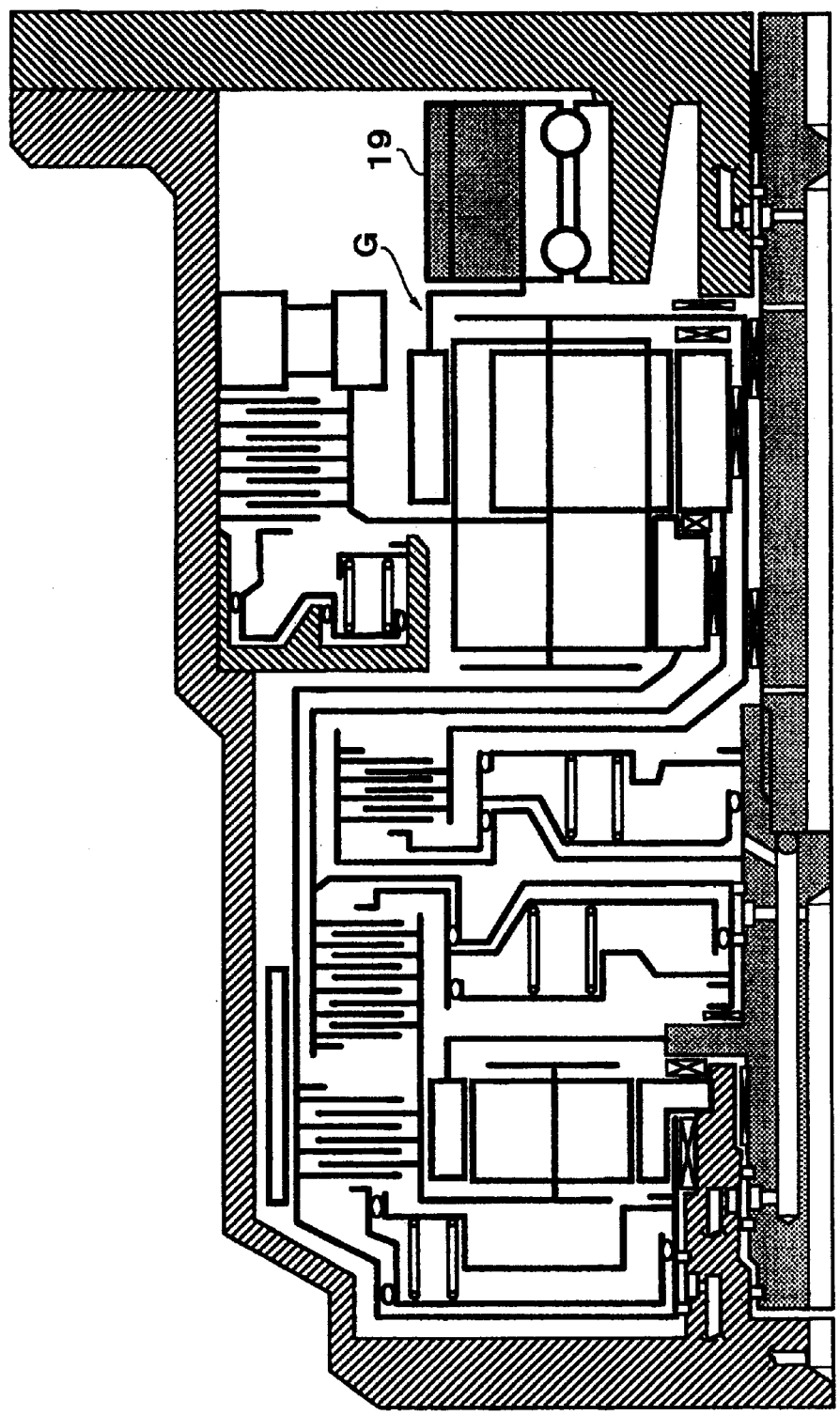
FIG. 14 is an axial cross sectional diagram illustrating an eighth embodiment.

FIG. 14 is a cross sectional view simply illustrating the eighth embodiment in which the same reasoning as the fourth embodiment is applied to a structure by arranging the high torque transmission members in the rear end portion of the transmission. In the embodiment, all arrangements are reversed from the fourth embodiment. The structure is adequate for a transaxle in which the second axis is an idler shaft the same as the seventh embodiment. Especially, in the embodiment, the planetary gear set G and the counter drive gear 19, which are heavy elements, are arranged in the front side so that the rigidity of the transmission is improved.

Figure 15:
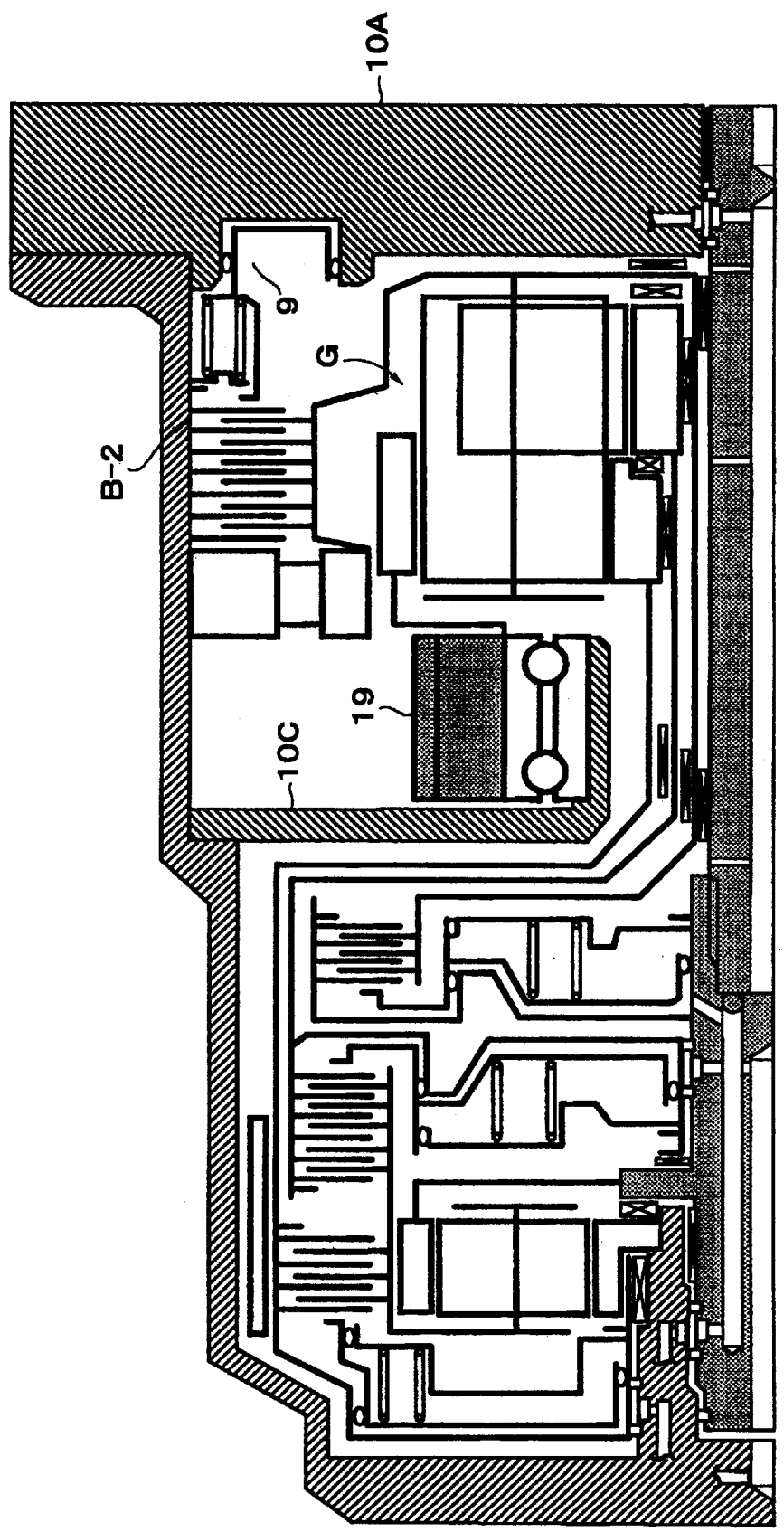
FIG. 15 is an axial cross sectional diagram illustrating a ninth embodiment.

FIG. 15 is a cross sectional view simply illustrating the ninth embodiment in which the positions of the planetary gear set G and the counter drive gear 19 are exchanged. In the embodiment, the counter drive gear 19 is supported by the support 10C in the same way as with the fifth embodiment. The hydraulic servo 9 of the second brake B-2 is built into the front end wall 10A of the transmission case. In the embodiment, the planetary gear set G and the counter drive gear 19, which are heavy elements, are arranged in the front side so that the rigidity of the transmission is improved.

In the aforementioned embodiments, the invention is applied to a transaxle. But the invention can also be applied to a parallel type transmission for a front engine/rear drive (FR) vehicle. FIGS. 16 through 19 illustrate the tenth embodiment. The shift mechanism in this embodiment is substantially the same as the previously described embodiments. However, there are two difference because of the parallel type transmission. The first difference is that one-way clutch F-1 is arranged in parallel with the first brake B-1 in similar way of the arrangement of the one-way clutch F-1 in parallel with the second brake B-2 in the previously described embodiments to simplify hydraulic control in the shift transition state, especially in the clutch to clutch shift. The second difference is that the ring gear R2 (R3) as the output element, is connected to the output shaft and coaxially arranged with the input shaft 11.

According to the addition of these structural elements, the applications of the second brake B-2 and the one-way clutch F-1 are changed from the previously described embodiments. Therefore, a description follows to prevent any confusion.

Figure 16:
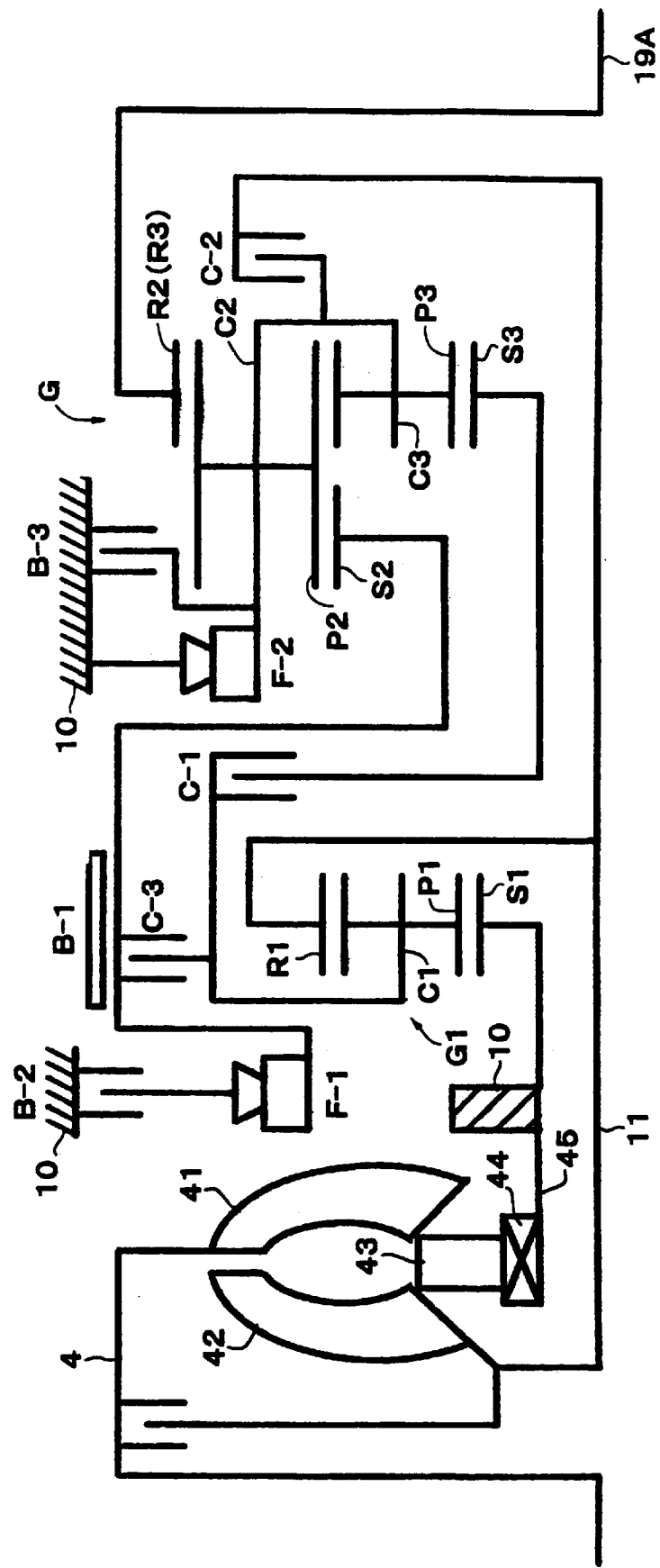
FIG. 16 is a schematic diagram illustrating a tenth embodiment.

FIG. 16 illustrates the gear train of the tenth embodiment using a schematic diagram. In the automatic transmission, a torque converter 4, which is connected to an engine (not shown), having a lockup clutch is arranged in the mostly front portion of the transmission. A shift mechanism establishing forward six speeds and one reverse speed is arranged to the rear side of the torque converter 4. The torque converter 4 comprises a pump impeller 41, a turbine runner 42, a stator 43 arranged between the pump impeller 41 and the turbine runner 42, a one-way clutch 44 rotatably engages the stator 43 in one direction with a transmission case 10, and a stator shaft 45 fixes the inner race of the one-way clutch on the transmission case 10.

A planetary gear set G, mainly structuring the shift mechanism, the same as the previously described embodiments, is structured from a ravegneaux type gear set which comprises a pair of sun gears S2, S3 having different diameters, a carrier C2 (C3) supporting a pair of pinion gears P2, P3 which are engaged with each other, of which one is engaged with the large sun gear S2 and the ring gear R3 and the other is engaged with the small sun gear S3.

A reduction planetary gear G1, similarly, is structured from a simple planetary gear in which a ring gear R1, as an input element, is connected to the input shaft 11, a carrier C1 as an output element is connected through a first clutch C-1 to the small sun gear S3 and through a third clutch C-3 to the large sun gear S2. A sun gear S1, as a stationary element receiving a reaction force, is fixed on the transmission case 10.

Figure 18:
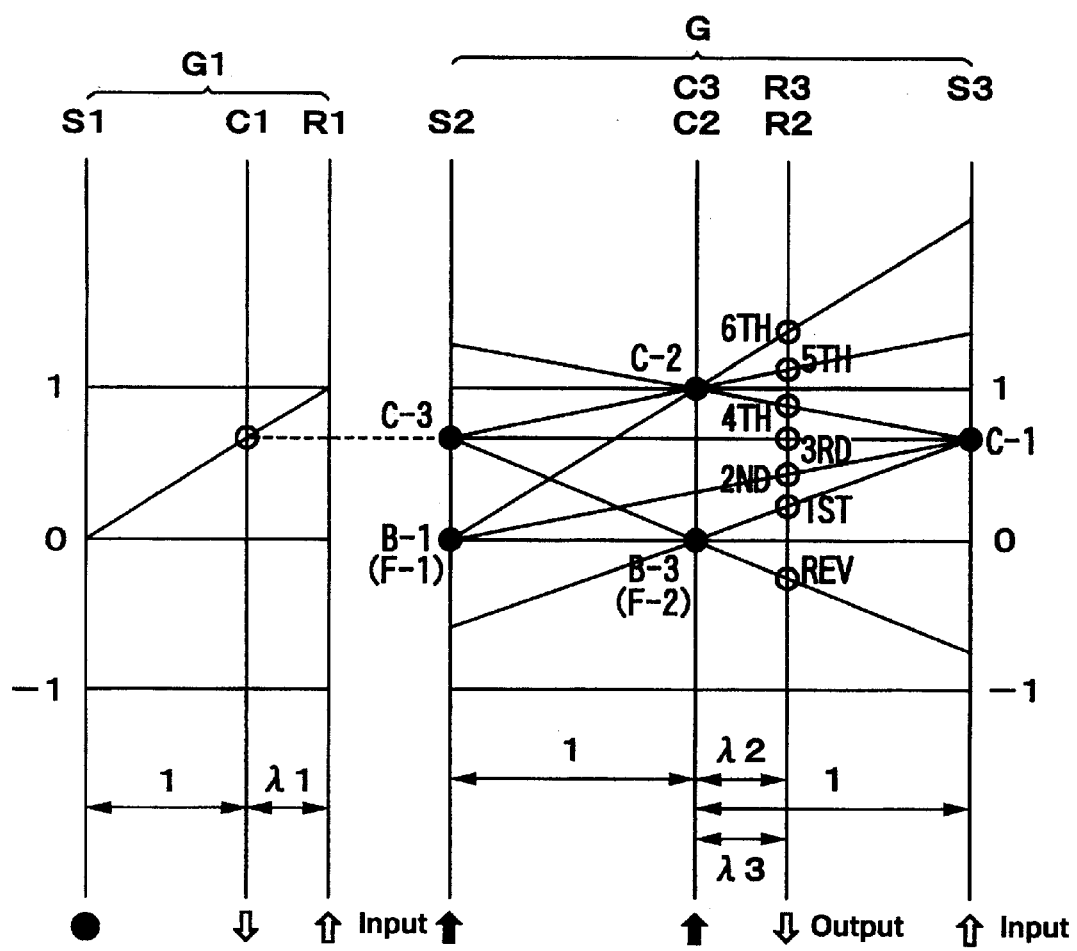
FIG. 18 is a velocity diagram for the gear train in the tenth embodiment.

The engagement table of FIG. 17 shows the relationship between the engagement/disengagement of each clutch, brake and one-way clutch and the established gear stages for the automatic transmission. In the table, the symbol ○ means engagement, a blank means disengagement, the symbol Δ means engagement for achieving engine brake, and the symbol ● means engagement which does not directly affect the establishment of the gear stage. FIG. 18 shows the relationship between the gear stages established by engagement of the clutches and brakes and the rotation speed ratio of each shift element by gear stage. It should be noted that the symbol ● means engagement in this table.

As shown in the figures, a first speed (1ST) is established by engagement of the clutch C-1 and the brake B-3. It should be noted that, in this embodiment, as shown in the operational table, the automatic engagement of the one-way clutch F-2 is used instead of engagement of the brake B-3. The reasons for using such engagement and that the engagement is equivalent to the engagement of the brake B-3 are the same as the reasons which have been already described with respect to the relationship between the brake B-2 and the one-way clutch F-1 in the previously described embodiments. In the first ratio, the decelerated rotation, which is decelerated from the rotation of the input shaft 11 through the reduction planetary gear G1, is inputted to the small sun gear S3 through the clutch C-1. The carrier C3, which is engaged with the transmission case 10 by engagement of the one-way clutch F-2, acts as a reaction element, and the decelerated rotation of the ring gear R3 having the largest reduction ratio is outputted to the output shaft 19A.

Next, a second speed (2ND) is established by engagement of the clutch C-1, engagements of the one-way clutch F-1 and the brake B-2, which is engaged for validating the engagement of the one-way clutch F-1, which is equivalent to engagement of the brake B-1. It should be noted that the reason for the engagements of the one-way clutch F-1 and the brake B-2 are equivalent to the engagement of the brake B-1 will be addressed later. In this case, the decelerated rotation, which is decelerated from the rotation of the input shaft 11 through the reduction planetary gear G1, is inputted to the small sun gear S3 through the clutch C-1, the large sun gear S2, which is engaged with the transmission case 10 by the engagements of the brake B-2 and the one-way clutch F-1, acts as a reaction element, and the decelerated rotation of the ring gear R3 is outputted to the output shaft 19A. The reduction ratio in this case is less than the reduction ratio in the first speed (1ST) as shown in FIG. 18.

Further, a third speed (3RD) is established by concurrently engaging of the clutches C-1, C-3. In this case, the decelerated rotation, which is decelerated from the rotation of the input shaft 11 through the reduction planetary gear G1, is concurrently inputted to the large sun gear S2 and the small sun gear S3 through the clutches C-1, C-3 so that the planetary gear set G is in the directly connected state, the rotation of the ring gear R3, which is the same as the input rotation inputted to both sun gears S1, S2, is outputted to the output shaft 19A as the rotation decelerated from the rotation of the input shaft 11.

Further, a fourth speed (4TH) is established by the concurrent engagement of the clutches C-1, C-2. In this case, the decelerated rotation, which is decelerated from the rotation of the input shaft 11 through the reduction planetary gear G11, is inputted to the small sun gear S3 through the clutch C-1 on one side. The rotation, which is not reduced and inputted from the input shaft 11 through the clutch C-2, is inputted to the carrier C3 on the other side, and the middle rotation between the two input rotations, which is the rotation of the ring gear R3 barely decelerated from the rotation of the input shaft 11, is outputted to the output shaft 19A.

Next, a fifth speed (5TH) is established by the concurrent engagement of the clutches C-2, C-3. In this case, the decelerated rotation, which is decelerated from the rotation of the input shaft 11 through the reduction planetary gear G1, is inputted to the small sun gear S2 through the clutch C-3 on one side. The non-decelerated rotation, which is not reduced and inputted from the input shaft 11 through the clutch C-2, is inputted to the carrier C2 on the other side, and the rotation, which is barely accelerated from the rotation of the input shaft 11, of the ring gear R3 is outputted to the output shaft 19A.

A sixth speed (6TH) is established by engagement of the clutch C-2 and the brake B-1. In this case, the non-decelerated rotation from the input shaft 11, which is not reduced, is inputted to only the carrier C2 through the clutch C-2. The sun gear S2, which is engaged with the transmission case by the engagement of the brake B-1, acts as a reaction element, and the rotation of the ring gear R3, which is further accelerated, is outputted to the output shaft 19A.

A reverse speed (REV) is established by the engagement of the clutch C-3 and the brake B-3. In this case, the decelerated rotation, which is decelerated from the rotation of the input shaft 11 through the reduction planetary gear G1, is inputted to the sun gear S2 through the clutch C-3. The carrier C2, which is engaged with the transmission case 10 by engagement of the brake B-3, acts as a reaction element, and the rotation of the ring gear R3, which is a reverse rotation, is outputted to the output shaft 19A.

The relationship between the one-way clutch F-1 and both brakes B-1, B-2 mentioned above will be described. In this case, the engagement direction of the one-way clutch F-1, connected to the sun gear S2, is set as the same direction in which the sun gear S2 supports the reaction torque in the second speed so that the one-way clutch F-1 performs substantially the equivalent function as the engagement of the brake B-1. The function of the sun gear S2 is different from the function of the carrier C2 (C3). That is, the sun gear S2 is engaged with the case 10 for achieving the engine brake in the second speed and for establishing the sixth speed. Therefore, the brake B-1 is needed. Further, as shown in the velocity diagram in FIG. 18, the sun gear S2 rotates in the reverse direction against the input rotation direction in the first speed (1ST), but rotates in same direction with the input rotation direction in the gear stages higher than the third speed. Therefore, the one-way clutch F-1 is not able to directly connect to a stationary member. Therefore, the one-way clutch F-1 and the brake B-2 are arranged in series so that the engagement state of the one-way clutch F-1 is effectively operated.

As shown with the clearance in the up/down direction between symbols ○ which show the speed ratios of the ring gear R2, R3 on the velocity diagram in FIG. 18, each gear stage thus established has a proper speed step having a relatively equivalent interval for each gear stage. The relationship is shown with gear ratios and steps between gear ratios in FIG. 17 by specifically setting values and quantitatively showing. The gear ratio is a value where a teeth number ratio λ1 between the sun gear S1 and the ring gear R1 of the reduction planetary gear G1 equals 0.556, a teeth number ratio λ2 between the sun gear S2 of the large sun gear side and the ring gear R2 (R3) of the planetary gear set G equals 0.458, and a teeth number ratio λ3 between the sun gear S3 of the small sun gear side and the ring gear R3 equals 0.375, the width of the gear ratios is equals 6.049.

Figure 19:
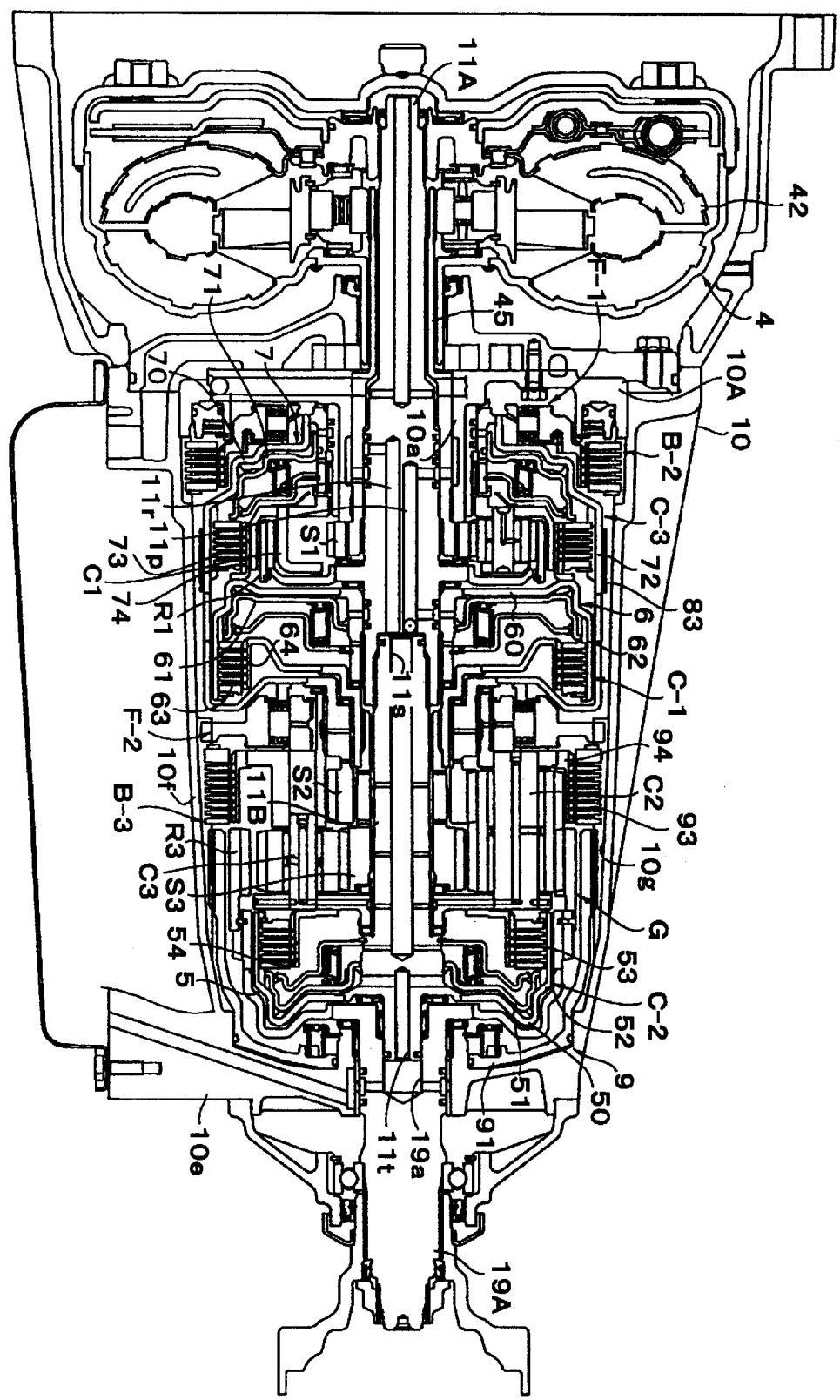
FIG. 19 is an axial cross sectional diagram illustrating the gear train in the tenth embodiment.

Next, FIG. 19 illustrates in further detail the structure of the automatic transmission with a cross sectional view. Each structural element, which was described before with reference to the schematic diagram, is identified with the same reference numeral or notation and the description is omitted. Detail portions, which could not be shown in the schematic diagram, will be described. The input shaft 11 is divided into a shaft front half portion 11A and a shaft rear half portion 11B for simplifying assembly. The two shafts 11A, 11B are integrally connected with each other by closely engaging with a spline engagement. The front end portion, having a small diameter, of the input shaft 11 is connected to the turbine runner 42 of the torque converter 4 and the front portion, having a large diameter, of the input shaft 11 is rotatably supported through the stator shaft 45 by a front boss portion 10a of a front end wall 10A structured from an oil pump cover of the transmission case 10. The rear end portion, having a small diameter of the input shaft rear half portion 11B is inserted in a trough portion 19a of the output shaft 19A and rotatably supported through the output shaft 19A by a rear end wall portion 10e of the transmission case 10. The input portion to the reduction planetary gear is a flange portion of the input shaft front half portion 11A, and the flange is connected to the ring gear R1.

A shaft hydraulic path 11p for applying a line pressure connected to a hydraulic path formed in the front boss portion 10a and a shaft hydraulic path 11r for applying a lubrication oil are formed in the input shaft front half portion 11A. The axial end portion of the shaft hydraulic path 11p is shut and the shaft hydraulic path 11p is connected to the hydraulic servo 6 of the first clutch with a radial hydraulic path. The axial end portion of the shaft hydraulic path 11r for applying the lubrication oil is opened and connected to a shaft hydraulic path 11s for applying a lubrication oil formed in the input shaft rear half portion 11B. The shaft hydraulic path 11s for applying the lubrication oil formed in the input shaft rear half portion 11B ends at the portion closed to the rear end portion of the shaft and is separated from a shaft hydraulic path 11t for applying the line pressure formed in the rear end portion of the shaft.

The output shaft 19A is rotatably supported through a roller bearing by a rear end wall portion 10e of the transmission case at the front end portion and through a ball bearing by a hindmost position of the transmission case 10 at the rear end portion. A connecting portion to the output element of the planetary gear set G is a flange of the input shaft rear half portion 11B. The flange is connected through a member shaped as a drum to the ring gear R3.

A shaft hydraulic path for applying line pressure, which is connected to a hydraulic path formed in the rear portion of the transmission case 10, is structured from the trough portion 19a, and the shaft hydraulic path is connected through the shaft hydraulic path 11t, formed in the rear end portion of the input shaft rear half portion 11B inserted in the trough portion 19a, to the hydraulic servo 5 of the second clutch C-2.

The planetary gear set G is arranged on the axial middle portion of the input shaft rear half portion 11B. The sun gear S3 is rotatably supported on the input shaft rear half portion 11B and the sun gear S2 is rotatably supported on the sun gear S3. The carriers C2, C3 supporting the pinions P2, P3 are integrated. The front end portion of the carriers C2, C3 is rotatably supported on the sun gear S2, and the rear end portion is rotatably supported on the input shaft rear end portion 11B.

The reduction planetary gear G1 is arranged on the axial middle portion of the large diameter portion of the input shaft front half portion 11A. The sun gear S1 is fixed on the rear end of the stator shaft 45 as the front boss portion 10a of the transmission case 10, with a spline engagement. The carrier C1 of the reduction planetary gear G1 is supported on the boss portion 10a structured from the oil pump cover at one side.

The cylinder 60 of the first clutch C-1 is rotatably supported on the input shaft front half portion 11A and connected through the hub 74 of the third clutch C-3 to the carrier C1 of the reduction planetary gear G1. The frictional member 63 of the clutch C-1 is structured from multiple frictional members and separator plates. The separator plates are engaged and supported on the inner surface of the drum 62, and the frictional elements are engaged and supported on the outer surface of the hub 64. That is, the frictional member 63 is arranged between the drum 62 and the hub 64. The inner side of the hub 64 is connected to the sun gear S3.

The hydraulic servo 6 of the clutch C-1 is structured from the cylinder 60, which is the inner side surface of the drum 62, a piston 61 is axially slidably inserted in the cylinder 60, a cancel plate is axially fixed in the drum 62, and a return spring is arranged between the piston 61 and the cancel plate.

The drum 72 of the third clutch C-3 is connected to the inner race of the one-way clutch F-1. The front end portion of the drum 72 is rotatably supported on the front boss portion 10*a* of the transmission case 10, and the rear end portion is connected through a power transmission member shaped as a drum to the SLILI gear S2. The frictional member 73 of the clutch C-3 is structured from multiple frictional discs and separator plates. The separator plates are engaged and supported on the inner surface of the drum 72, and the frictional discs are engaged and supported on the outer surface of the hub 74. That is, the frictional member 63 is arranged between the drum 72 and the hub 74. The rear end of the hub 74 is fixed to the drum 62 of the first clutch C-1. The hydraulic servo 7 of the third clutch C-3 is structured from the cylinder 70 integrated with the drum 72, a piston 71 is axially slidably inserted in the cylinder 70, a cancel plate is axially fixed on the inner side of the cylinder 70, and a return spring is arranged between the piston 71 and the cancel plate.

The drum 52 of the second clutch C-2 is fixed to and supported on the flange of the input shaft rear half portion 11B at one side. The frictional member 53 of the second clutch C-2 is structured from multiple frictional discs and separator plates. The separator plates are engaged and supported on the inner surface of the drum 52, and the frictional discs are engaged and supported on the outer surface of the hub 54. That is, the frictional member 53 is arranged between the drum 52 and the hub 54. The front end of the hub 54 is fixed and supported to the carrier C3 of the planetary gear set G at one side. The hydraulic servo 5 of the second clutch C-2 is structured from the cylinder 50 having the outer surface of the input shaft 11 as the portion of the cylinder 50 and integrated with the drum 52, a piston 51 is axially slidably inserted in the cylinder 50, a cancel plate is axially fixed on the input shaft rear half portion 11B, and a return spring is arranged between the piston 51 and the cancel plate.

The first brake B-1 is a band brake having a band 83 engaged with the outer surface of the drum 72 of the third clutch C-3. A hydraulic servo of the brake B-1 is omitted in the figure.

The third brake B-3 is a multi-disc brake having a frictional member 93 structured from multiple frictional discs and separator plates. The third brake B-3 functions similarly to second brake B-2 of the first embodiment as it is connected to carrier C2 (C3), i.e., it is the second engagement element. The separator plates are engaged and supported on the inner surface of the transmission case 10, and the frictional discs are engaged and supported on a hub 94 fixed to the carrier C2. A hydraulic servo 9 of the third brake B-3 is structured from a cylinder formed in the rear end wall portion 10*e* of the transmission case mainframe 10B, a piston 91 is slidably inserted in the cylinder, and a return spring is axially fixed to the rear end wall portion of the transmission case to engage with the piston 91. The extending portion, which extends toward the frictional member 93 along with the surrounding wall 10*f* of the case, of the piston 91 is engaged with a spline 10*g* of the case surrounding wall 10*f*.

The frictional member 93 of the third brake B-3 is arranged at an outer radial position of the large sun gear S2 of the planetary gear set G.

The inner race of the one-way clutch F-1 is fixed to the cylinder 70 of the third clutch C-3, the outer race is integrated with the hub of the second brake B-2. The one-way clutch F-1 is arranged in the front position of the third clutch C-3, that is, in the mostly front portion of the shift mechanism. The second brake B-2, which engages the outer race with the transmission case 10, is a multi-disc brake having a frictional member structured from multiple frictional discs and separator plates. The frictional discs are engaged and supported on the outer race, and the separator plates are engaged and supported with the inner spline of the transmission case 10. A hydraulic servo of the second brake B-2 is structured from a cylinder formed in the front end wall 10A of the transmission case 10, a piston is slidably inserted in the cylinder, and a return spring is axially fixed to the front end wall of the transmission case 10 to engage with the piston.

The inner race of the one-way clutch F-2 is connected to the front end portion of the carrier C2 with a spline, and the outer race is engaged with a spline 10*g* of the inner surface of the transmission case 10. The one-way clutch F-2 is arranged between the frictional member 63 of the first clutch C-1 and the planetary gear set G.

In the tenth embodiment, as mentioned, the hydraulic servo 6 of the first clutch C-1 is arranged in order that the cylinder 60 is opened to the opposite side of the reduction planetary gear G1 and connected to the clutch drum 62 of the first clutch C-1 at the outer portion, and the clutch drum 62 is connected to the carrier C1 of the reduction planetary gear G1. Therefore, the high torque is transmitted from the clutch hub 64 to the drum 62 at the outer side without providing the high torque load to the hydraulic servo 6, which is connected to the inner side of the drum 62, of the first clutch C-1 the same as the third clutch C-3. As a result, the cylinder 60 of the hydraulic servo 6 in the inner side can be thin to reduce the weight and the size of the transmission.

The third clutch C-3 is arranged in the front position of the reduction planetary gear G1. The cylinder 70 of the hydraulic servo 7 of the clutch is supported on the front boss portion 10*a* extended from the transmission front end wall 10A. The hydraulic pressure application path to the hydraulic servo 7 is formed in the front boss portion 10*a*. The sun gear S1 of the reduction planetary gear G1 is fixed to the front boss portion 10*a*, the ring gear R1 is connected to the input shaft 11 at the rear side, and the output from the carrier C1 is transmitted to the front side of the reduction planetary gear G1. Therefore, a special support member for fixing the sun gear S1 is not needed. The front boss portion 10*a*, which is used for supporting the clutch drum 72 and applying the hydraulic pressure, can be used as the member for fixing the sun gear S1. A compact transmission results.

Further, the stator shaft 45 is extended, and the sun gear S1 of the reduction planetary gear G1 is fixed to an end of the stator shaft 45 as the front boss portion 10*a*. Therefore, the sun gear S1 is downsized and the entirety of the reduction planetary gear is downsized. Further, by the downsizing, the reduction planetary gear G1 can be arranged in the inner position of the frictional member 73 of the third clutch C-3. Thus, the axial size of the transmission is shortened.

The reduction planetary gear G1 is arranged between the hydraulic servos 6, 7 of the first and third clutches C-1, C-3. The cylinder 70 structuring one of the hydraulic servos is rotatably supported on the front boss portion. The cylinder 60 structuring the other hydraulic servo is rotatably supported on the input shaft 11. Therefore, compared with a case in which the hydraulic servo is supported on the front boss portion 10a of the transmission case 10, the pressure receiving area of the piston 61 can be enlarged because the diameter of the support portion is small. As a result, it is easy to obtain the necessary torque capacity.

A particular effect achieved by applying the structure of the invention to the parallel type arrangement is that the diameter of the rear portion of the transmission is reduced with a resultant reduction in the vehicle space required because the clutch C-2, which has a small torque transmission capacity and a small diameter, is arranged in the hindmost position of the shift mechanism.

The trough portion 19a faced to the end portion of the input shaft 11 is formed on the output shaft 19A and the output shaft 19A is supported at the rear portion of the automatic transmission. The end portion, which faces to the front end portion of the output shaft 19A, of the input shaft 11 is inserted and supported in the trough portion 19a of the output shaft 19A. The hydraulic pressure application path to the hydraulic servo 5 of the second clutch C-2 is formed from the output shaft 19A through the rear end portion of the input shaft 11. The lubrication oil application path 10s for lubricating the inside of the automatic transmission is formed in the front side of the rear end portion in which the application path 11t is formed. Therefore, the diameter of the rear end portion of the input shaft 11 inserted in the trough portion 19a of the output shaft 19A is reduced as compared with the case in which the hydraulic pressure application path and the lubrication oil application path are arranged in parallel in the rear end portion of the input shaft 11. That is, the diameter of the rear portion, which is inserted in the trough portion 19a of the output shaft 19A for supporting the rear end portion of the input shaft 11, of the input shaft 11 is reduced. As a result, the diameter of the rear portion of the automatic transmission is reduced by reducing the diameter of the input shaft 11. Thus, the space required in a vehicle is further reduced.

Further, the frictional member 93 of the third brake B-3 is a multi-disc frictional member. The hydraulic servo 9 of the third brake B-3 is arranged in the hindmost position of the transmission. Therefore, the rear end wall portion of the transmission case 10 is used as the hydraulic servo cylinder, and the transmission case does not need to have a thrust portion which is needed for arranging the hydraulic servo of a band brake. As a result, the free space in the vehicle is not reduced. In case the brake is a band brake, the carrier engaged by the band brake receives a force in a certain direction, and this force causes an adverse effect to the centering and the support of the planetary gear set G and the centering and the support of the input shaft 11 supporting the planetary gear set G. Therefore, a bush or a bearing for supporting the input shaft 11 or the planetary gear set G or the input shaft 11 itself is needed and increases the size. However, in this embodiment, the third brake B-3 is a multi-disc brake so that a compact automatic transmission results.

Figure 20:
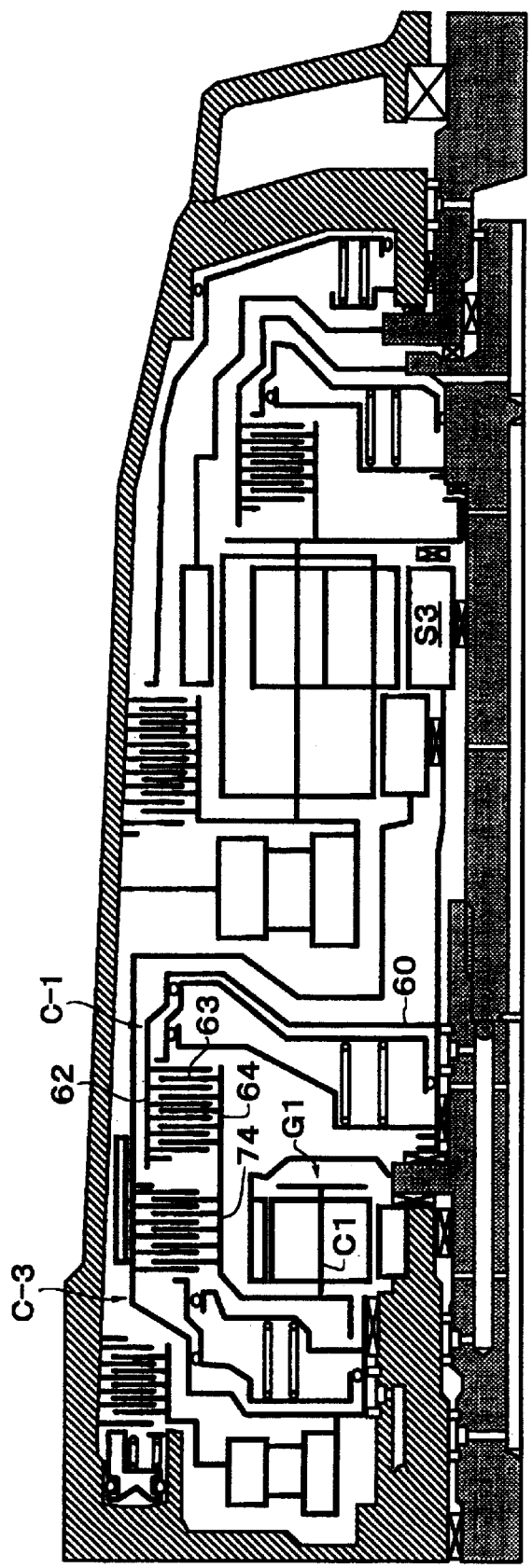
FIG. 20 is an axial cross sectional diagram illustrating an eleventh embodiment.

FIG. 20 is a simplified cross sectional view of the eleventh embodiment in which the connecting relationship between the reduction planetary gear G1 and the first and third clutches C-1, C-3 is the same as the first through ninth embodiments and the other arrangements are same as the tenth embodiment. In this embodiment, the clutch hub 64, engaged with the inner portion of the frictional member 63 of the first clutch C-1 is connected through the clutch hub 74 of the third clutch C-3 to the carrier C1 of the reduction planetary gear G1. The clutch drum 62 engaged with the outer portion of the frictional member 63 of the first clutch C-1 is connected to the small sun gear S3 of the planetary gear set G. The hydraulic servo 6 connected to the clutch drum 62 of the first clutch is arranged in order that the cylinder 60 is opened to the reduction planetary gear G1 side.

On the basis of the connecting relationship of the clutches, as mentioned in the first embodiment, the hydraulic servo cylinder 60 of the first clutch C-1 acts as the power transmission member so that a member radially traversing between members is displaced. Therefore, the axial size of the transmission is reduced.

Thus, the invention is described based on representative embodiments. The invention should not be limited to the foregoing embodiments but can be modified in various ways based on its gist, and the modifications should not be excluded from the scope of the invention.

What is claimed is:

1. An automatic transmission for a vehicle, comprising:
   a reduction planetary gear;
   a first clutch and a third clutch which transmit a decelerated rotation transmitted through the reduction planetary gear; and
   a planetary gear set inputted the decelerated rotation which is transmitted through the first and third clutches, and establishing multiple gear ratios;
   the reduction planetary gear is arranged between the first clutch and the third clutch.

2. The automatic transmission for a vehicle according to claim 1, wherein a first element of the planetary gear set is connected to an output side member of the first clutch,
   a second element is connected to an output side member of the third clutch and is engaged with a transmission case with a first engaging member under first predetermined conditions,
   a third element is connected to an output side member of a second clutch, which is inputted a non-decelerated rotation, and is engaged with a transmission case with a second engaging member under second predetermined conditions, and
   a fourth element is connected to an output member.

3. The automatic transmission for a vehicle according to claim 2, wherein one element of the reduction planetary gear is fixed to a boss portion extended from the transmission case,
   a hydraulic servo of the third clutch is rotatably supported on the boss portion,
   a hydraulic servo of the first clutch is arranged on an input shaft, and
   the third clutch and a one element of the planetary gear set are connected with a power transmission member which extends in a radially outer space of the first clutch.

4. The automatic transmission for a vehicle according to claim 3, wherein an output element of the reduction planetary gear is directly connected to a clutch hub which is engaged with an inner portion of a frictional member of the third clutch,
   the hydraulic servo of the third clutch is arranged in order that a cylinder opens to the reduction planetary gear side and is connected to a clutch drum which is engaged with an outer portion of the frictional member of the third clutch, and
   the clutch drum is connected through the power transmission member to the one element of the planetary gear set.

5. The automatic transmission for a vehicle according to claim 4, wherein a clutch hub, which is engaged with an inner portion of a frictional member of the first clutch, is connected to an output element of the reduction planetary gear; a clutch drum, which is engaged with an outer portion of the frictional member of the first clutch, is connected to a one element of the planetary gear set; and the hydraulic servo, which is connected to the clutch drum of the first clutch, is arranged in order that a cylinder opens to the reduction planetary gear side.

6. The automatic transmission for a vehicle according to claim 5, wherein the output element of the reduction planetary gear is connected to the clutch hub which is engaged with the inner portion of the frictional member of the third clutch, the frictional member of the third clutch is arranged in a radial outer side of the reduction planetary gear, and the clutch hub is further axially extended and connected to the clutch hub which is engaged with the inner portion of the frictional member of the first clutch.

7. The automatic transmission for a vehicle according to claim 4, wherein the hydraulic servo of the first clutch is arranged in order that a cylinder opens to an opposite side of the reduction planetary gear and is connected to a clutch drum of the first clutch at a radial outer portion, and a clutch drum of the first clutch is connected to an output element of the reduction planetary gear.

8. The automatic transmission for a vehicle according to claim 7, wherein the output element of the reduction planetary gear is connected to the clutch hub which is engaged with the inner portion of the frictional member of the third clutch arranged at a radial outer side of the reduction planetary gear, and the output element is connected to the clutch drum of the first clutch at the axially extending position.

9. The automatic transmission for a vehicle according to claim 4, wherein the hydraulic servo connected to the clutch drum of the third clutch is supported on the boss portion at a radial position of the reduction planetary gear.

10. The automatic transmission for a vehicle according to claim 9, wherein the first engaging member is structured from a band brake in which an outer surface of the clutch drum of the third clutch is an engaging surface engaged by a band.

11. The automatic transmission for a vehicle according to claim 4, wherein the first engaging member is structured from a band brake in which an outer surface of the clutch drum of the third clutch is an engaging surface engaged by a band.

12. The automatic transmission for a vehicle according to claim 3, wherein a hydraulic path for applying a hydraulic pressure to the hydraulic servo of the third clutch is formed in the boss portion, and a hydraulic path for applying a hydraulic pressure to the hydraulic servo of the first clutch is a hydraulic path connected through a shaft hydraulic path formed in the input shaft to a hydraulic path formed in the transmission case.

13. The automatic transmission for a vehicle according to claim 12, wherein the reduction planetary gear, the first clutch and the third clutch are arranged in a rear portion of the transmission, the shaft hydraulic path is connected to the hydraulic path formed in the transmission case at a rear end portion of the input shaft, and a seal ring is arranged between the input shaft and the transmission case for sealing.

14. The automatic transmission for a vehicle according to claim 1, wherein one element of the reduction planetary gear is fixed to a boss portion extended from the transmission case, a hydraulic servo of the third clutch is rotatably supported on the boss portion, a hydraulic servo of the first clutch is arranged on an input shaft, and the third clutch and a one element of the planetary gear set are connected with a power transmission member which extends in a radially outer space of the first clutch.

15. The automatic transmission for a vehicle according to claim 14, wherein an output element of the reduction planetary gear is directly connected to a clutch hub which is engaged with an inner portion of a frictional member of the third clutch, the hydraulic servo of the third clutch is arranged in order that a cylinder opens to the reduction planetary gear side and is connected to a clutch drum which is engaged with an outer portion of the frictional member of the third clutch, and a clutch drum is connected through the power transmission member to the one element of the planetary gear set.

16. The automatic transmission for a vehicle according to claim 15, wherein a clutch hub, which is engaged with an inner portion of a frictional member of the first clutch, is connected to the output element of the reduction planetary gear; a clutch drum, which is engaged with an outer portion of the frictional member of the first clutch, is connected to a one element of the planetary gear set; and the hydraulic servo, which is connected to the clutch drum of the first clutch, is arranged in order that a cylinder opens to the reduction planetary gear side.

17. The automatic transmission for a vehicle according to claim 16, wherein an output element of the reduction planetary gear is connected to the clutch hub which is engaged with the inner portion of the frictional member of the third clutch, the frictional member of the third clutch is arranged in a radial outer side of the reduction planetary gear, and the clutch hub is further axially extended and connected to the clutch hub which is engaged with the inner portion of the frictional member of the first clutch.

18. The automatic transmission for a vehicle according to claim 15, wherein the hydraulic servo of the first clutch is arranged in order that the cylinder opens to the opposite side of the reduction planetary gear and connected to the clutch drum of the first clutch at the radial outer portion, and the clutch drum of the first clutch is connected to the output element of the reduction planetary gear.

19. The automatic transmission for a vehicle according to claim 18, wherein the output element of the reduction planetary gear is connected to the clutch hub which is engaged with the inner portion of the frictional member of the third clutch arranged in the radial outer side of the reduction planetary gear, and the output element is connected to the clutch drum of the first clutch at the axially extending position.

20. The automatic transmission for a vehicle according to claim 15, wherein the hydraulic servo connected to the clutch drum of the third clutch is supported on the boss portion at the radially aligned position of the reduction planetary gear.

21. The automatic transmission for a vehicle according to claim 20, wherein a first engaging member is structured from a band brake in which the outer surface of the clutch drum of the third clutch is an engaging surface engaged by a band.

22. The automatic transmission for a vehicle according to claim 15, wherein a first engaging member is structured from a band brake in which the outer surface of the clutch drum of the third clutch is an engaging surface engaged by a band.

23. The automatic transmission for a vehicle according to claim 14, wherein a first engaging member is structured from a band brake in which the outer surface of the clutch drum of the third clutch is an engaging surface engaged by a band.

24. The automatic transmission for a vehicle according to claim 23, wherein the reduction planetary gear, the first clutch and the third clutch are arranged in a rear portion of the transmission, a shaft hydraulic path is connected to a hydraulic path formed in a transmission case at a rear end portion of an input shaft, and a seal ring is arranged between the input shaft and the transmission case for sealing.

* * * * *